(12) United States Patent
Queck et al.

(10) Patent No.: US 9,186,876 B1
(45) Date of Patent: Nov. 17, 2015

(54) MASKING TECHNOLOGY

(71) Applicant: Cardinal IG Company, Eden Prairie, MN (US)

(72) Inventors: Curtis Lee Queck, Spring Green, WI (US); Robert Casper Buchanan, Spring Green, WI (US); Michael John Milewski, Poynette, WI (US)

(73) Assignee: Cardinal IG Company, Eden Prairie, MN (US)

( * ) Notice: Subject to any disclaimer, the term of this patent is extended or adjusted under 35 U.S.C. 154(b) by 0 days.

(21) Appl. No.: 14/568,878

(22) Filed: Dec. 12, 2014

(51) Int. Cl.
*B32B 37/18* (2006.01)
*B32B 38/10* (2006.01)
*B32B 38/18* (2006.01)

(52) U.S. Cl.
CPC ............... *B32B 37/18* (2013.01); *B32B 38/10* (2013.01); *B32B 38/1825* (2013.01)

(58) Field of Classification Search
CPC .... B32B 37/18; B32B 38/10; B32B 37/0007; B32B 38/1825; B32B 2037/109; B32B 2038/0028
USPC ................. 156/364, 494, 511, 577, 495, 496
See application file for complete search history.

(56) References Cited

U.S. PATENT DOCUMENTS

| | | | |
|---|---|---|---|
| 5,020,288 A | 6/1991 | Swensen | |
| 5,599,422 A | 2/1997 | Adams, Jr. et al. | |
| 6,793,971 B2 | 9/2004 | Trpkovski | |
| 6,973,759 B2 | 12/2005 | Trpkovski | |
| 7,025,850 B2 | 4/2006 | Trpkovski | |
| 7,026,571 B2 | 4/2006 | Larsen | |
| 7,083,699 B2 | 8/2006 | Trpkovski | |
| 7,165,591 B2 | 1/2007 | Trpkovski | |
| 2003/0041533 A1 | 3/2003 | Trpkovski | |
| 2009/0255627 A1* | 10/2009 | Queck et al. | 156/269 |

* cited by examiner

*Primary Examiner* — George Koch
(74) *Attorney, Agent, or Firm* — Fredrikson & Byron, P.A.

(57) ABSTRACT

The invention provides masking machines for applying masking to glazing panels. Also provided are methods of applying masking to glazing panels.

18 Claims, 26 Drawing Sheets

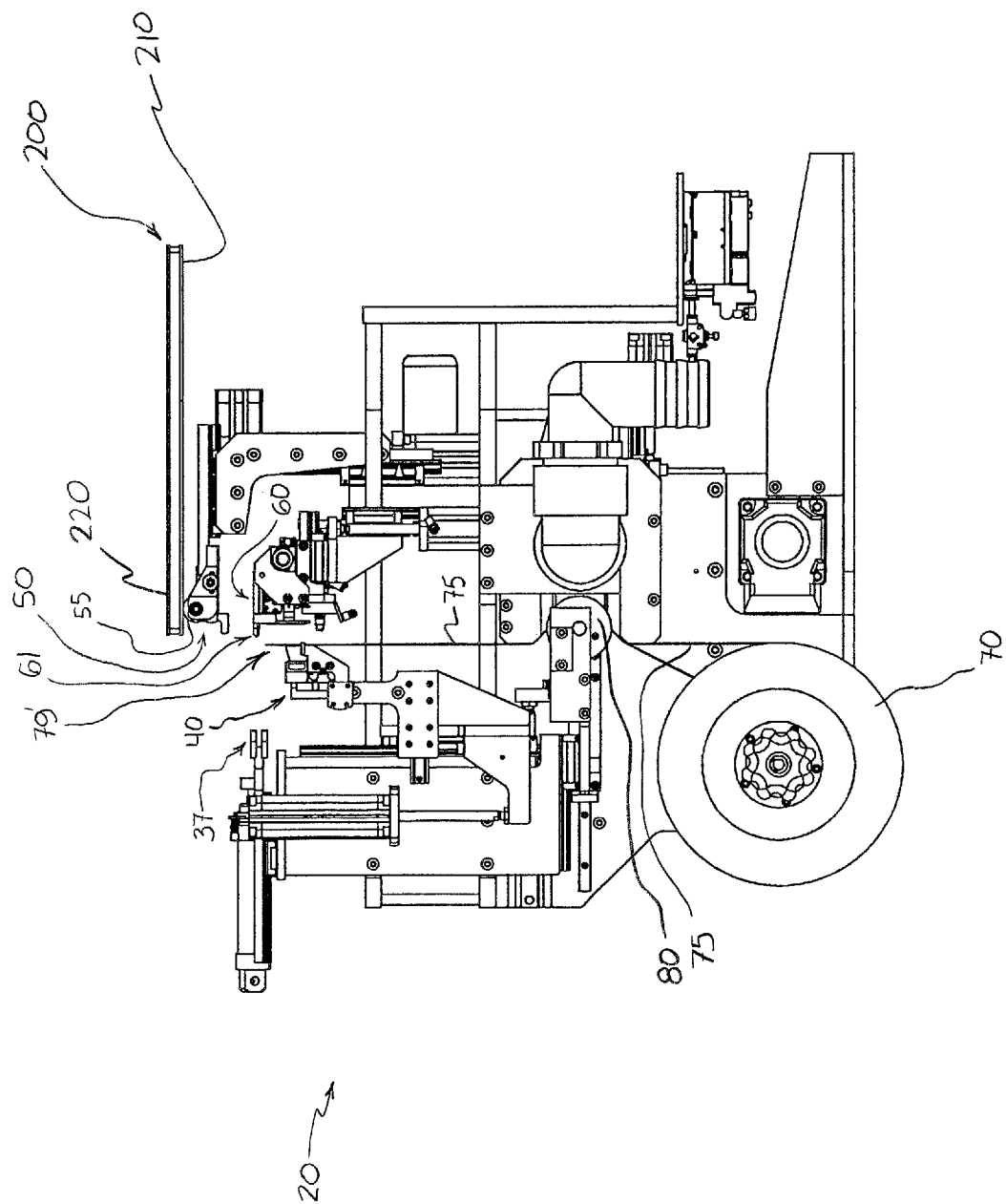

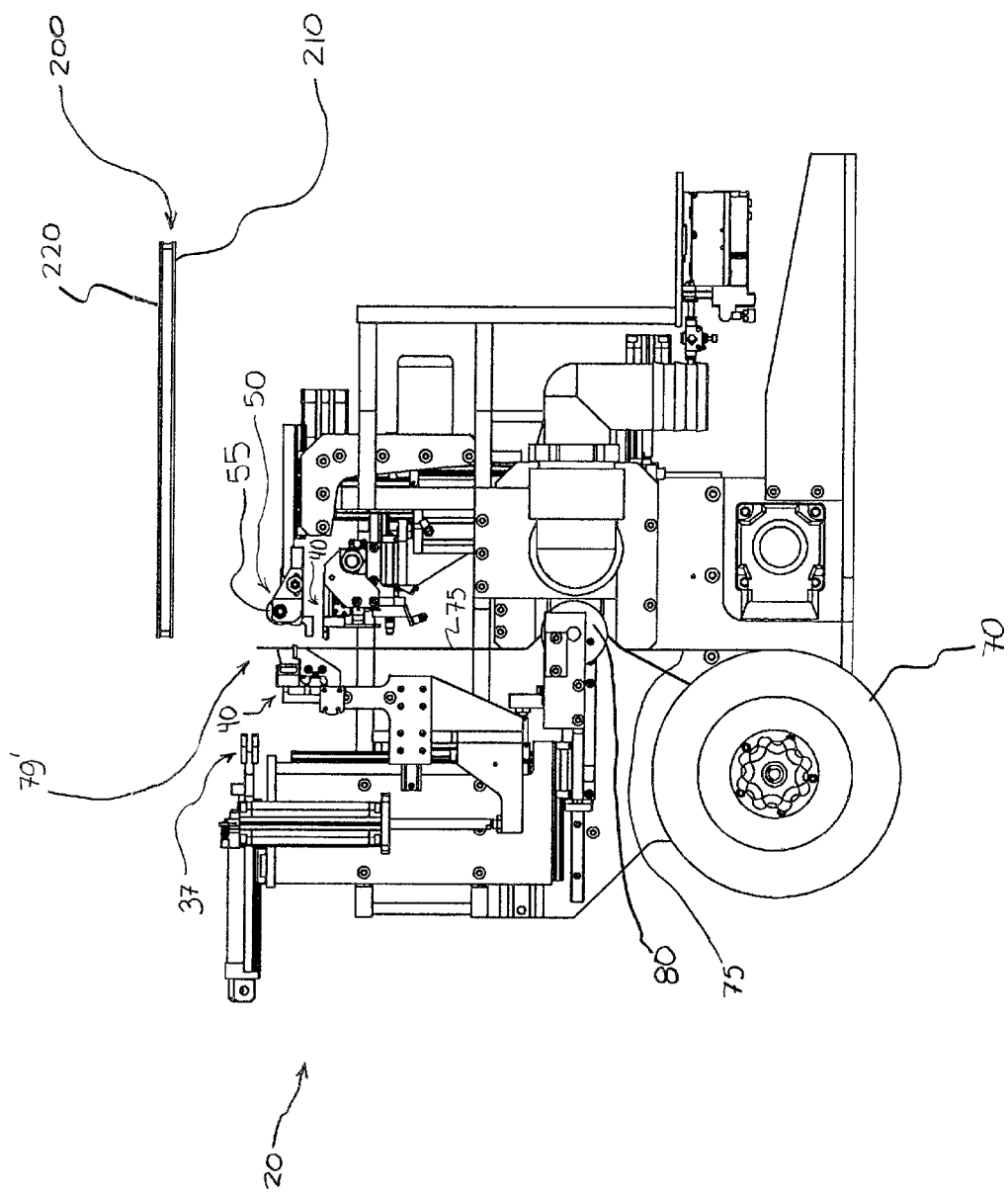

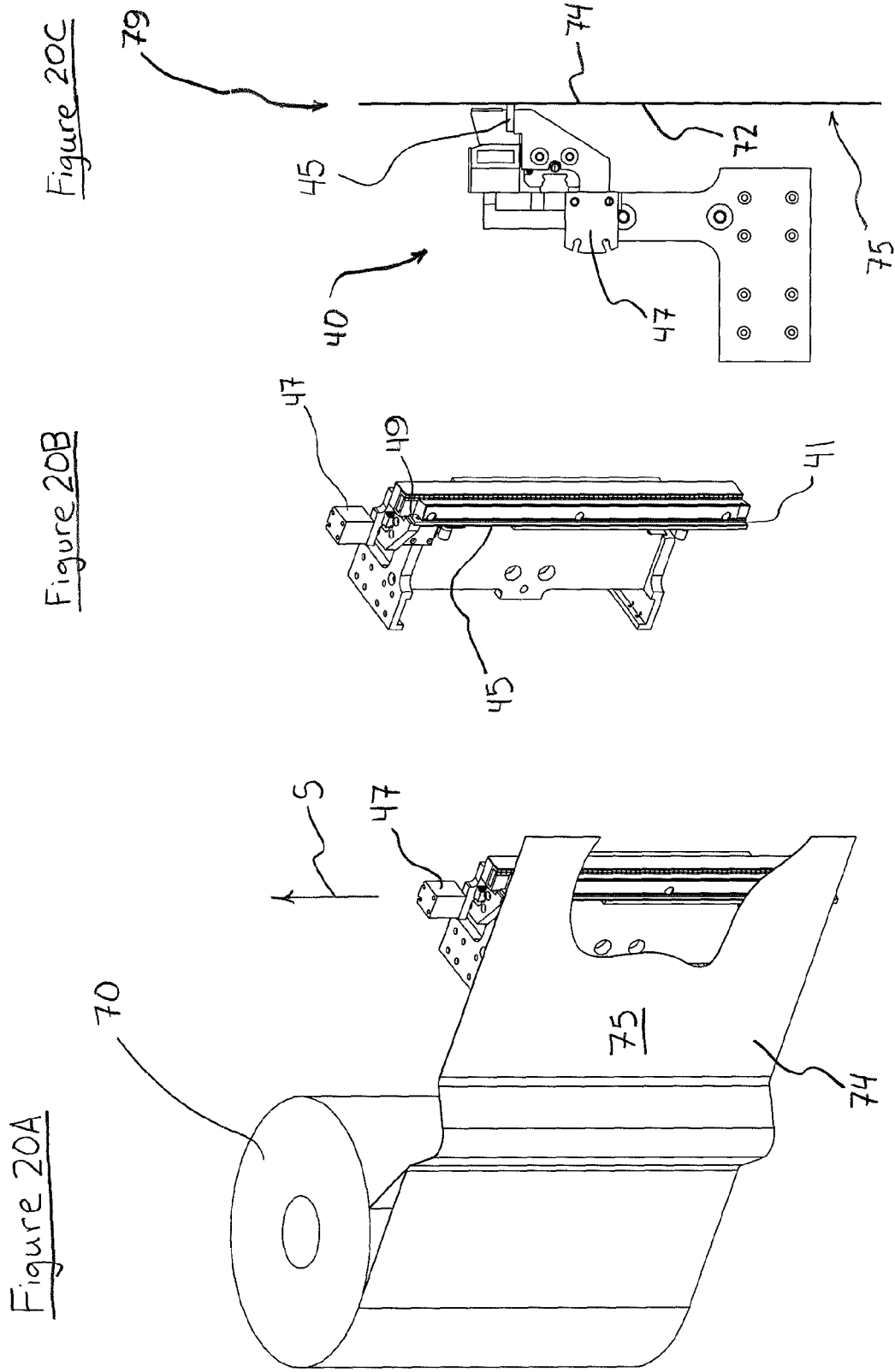

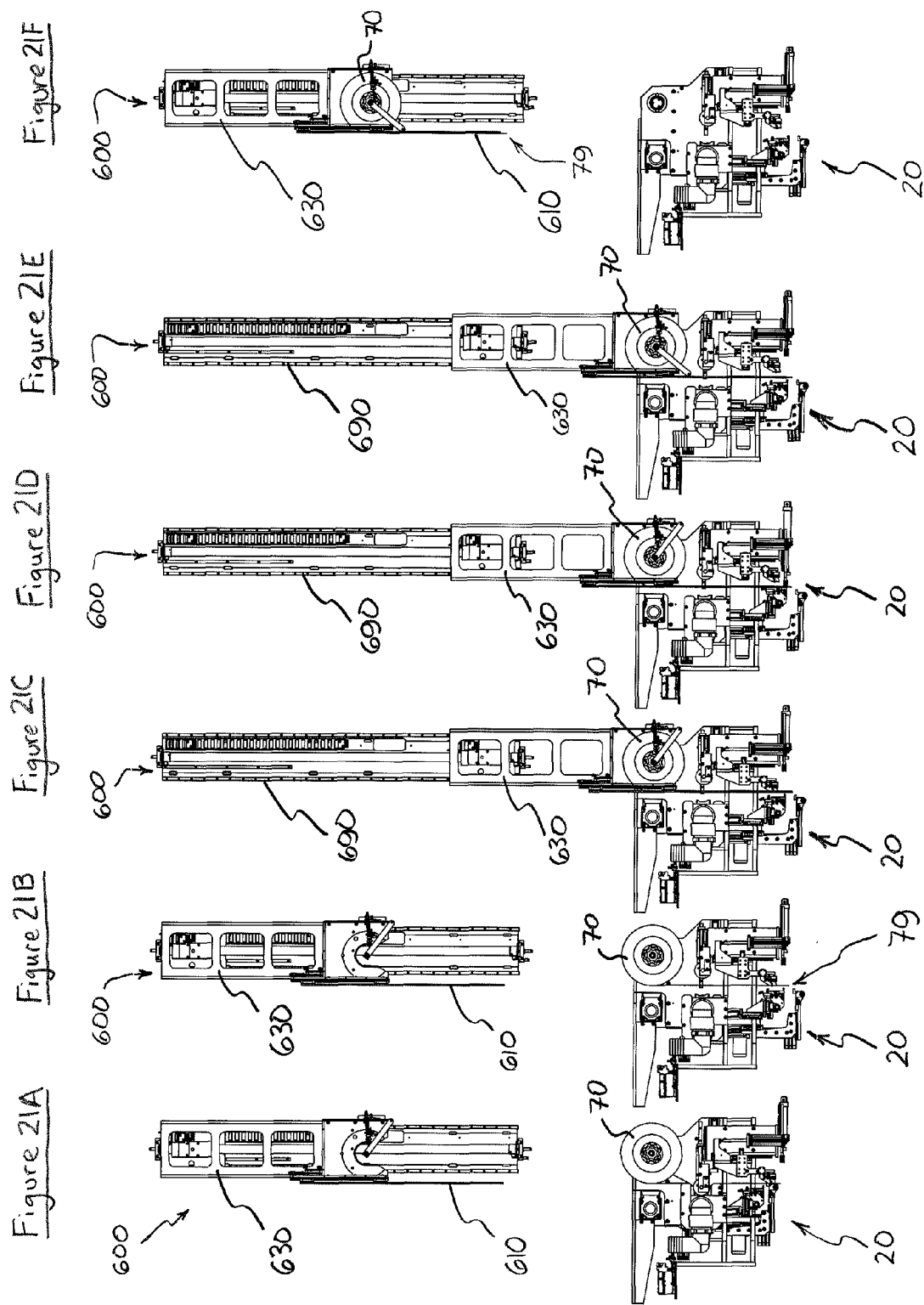

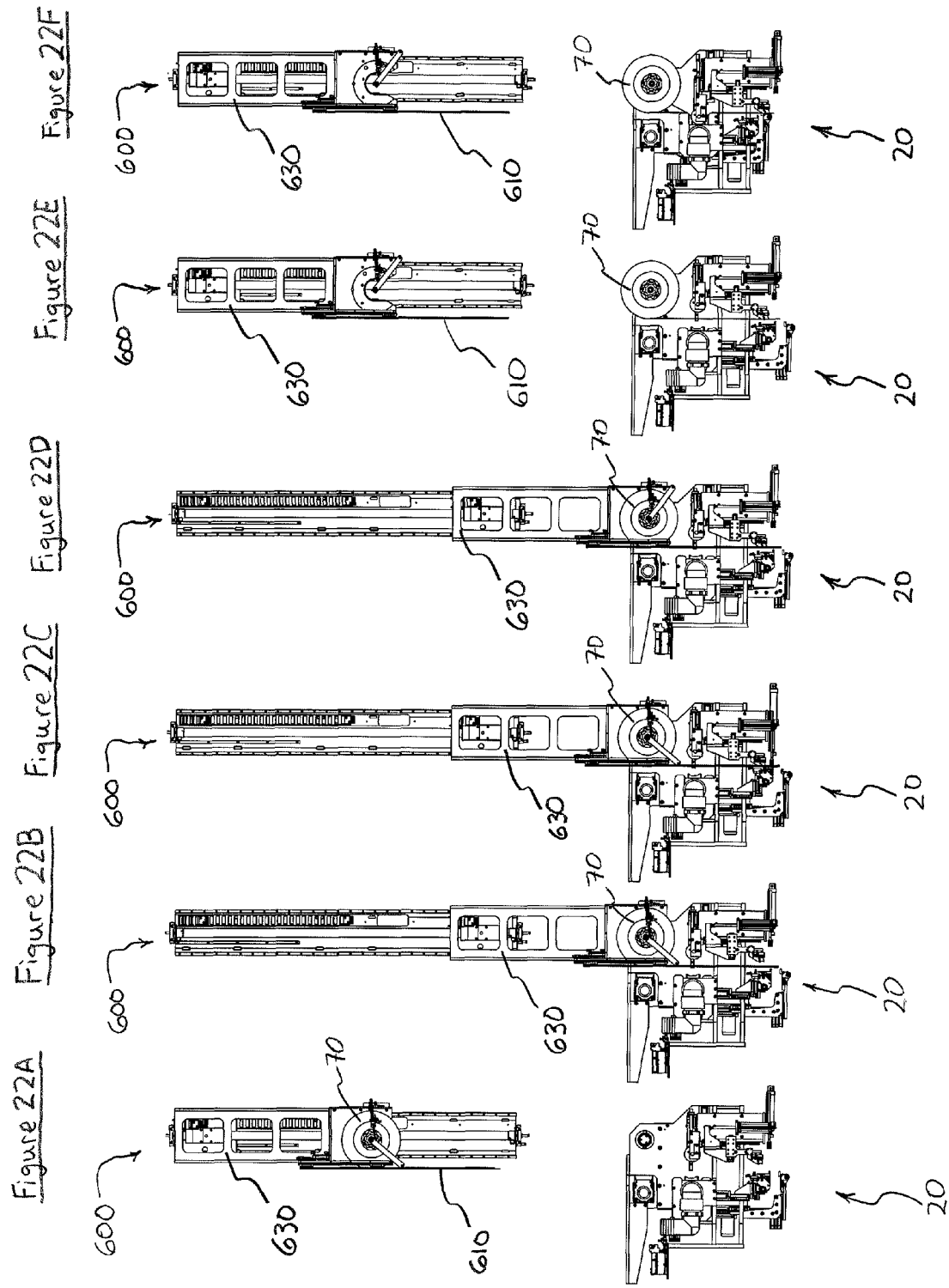

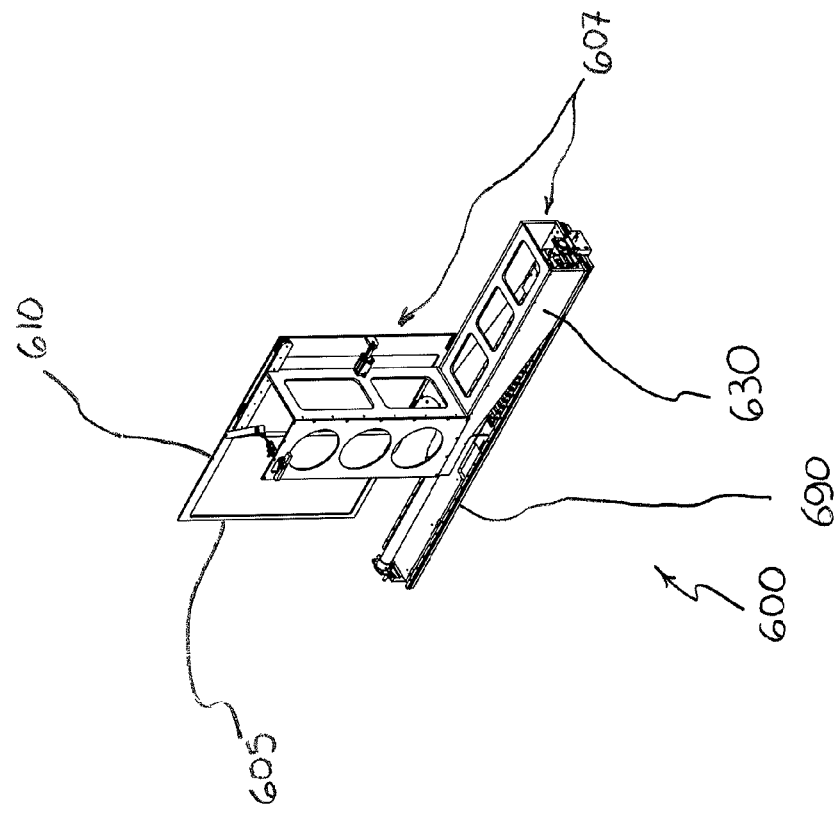
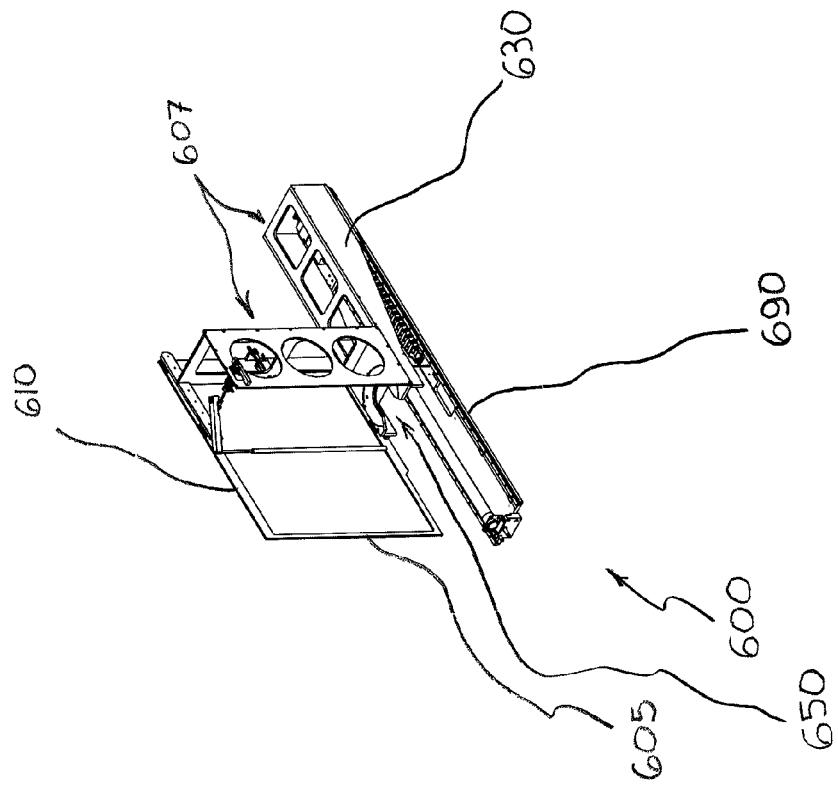

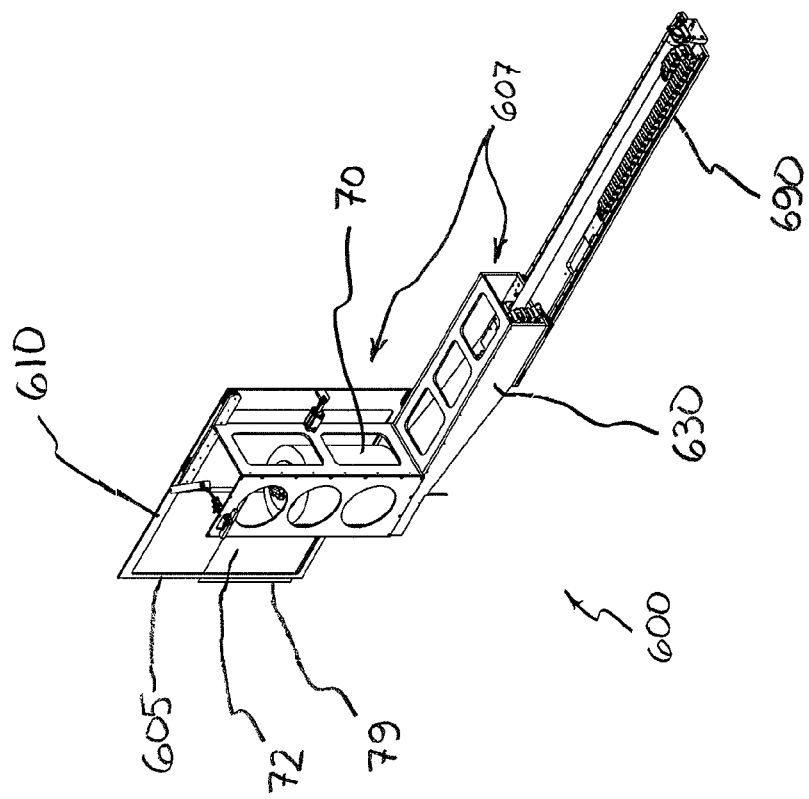
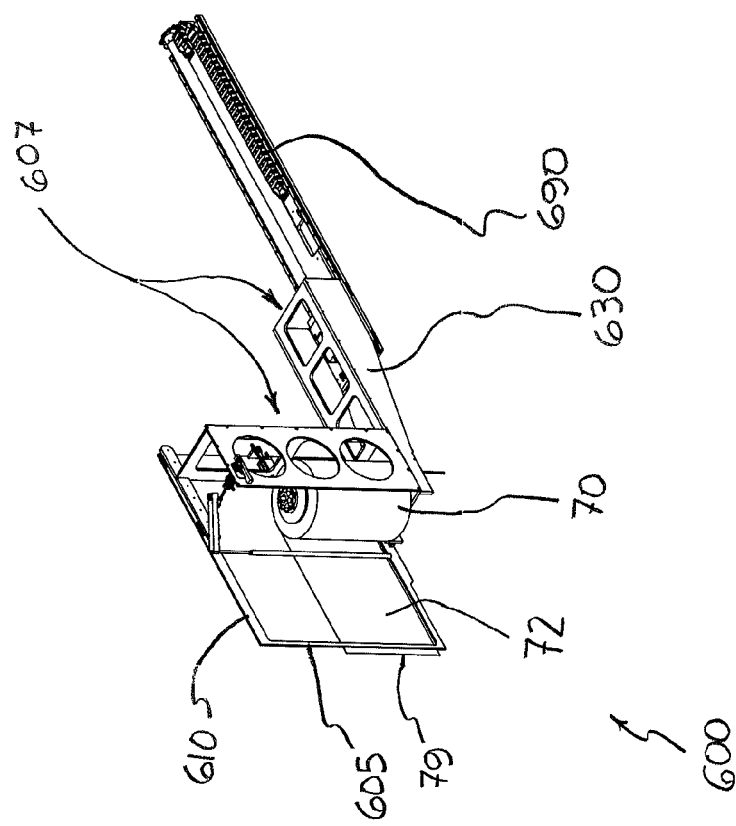

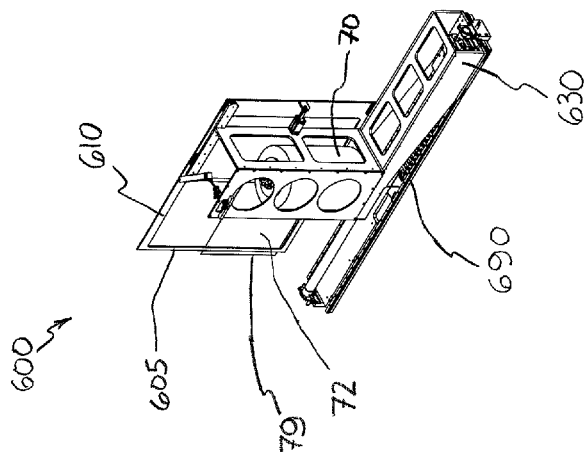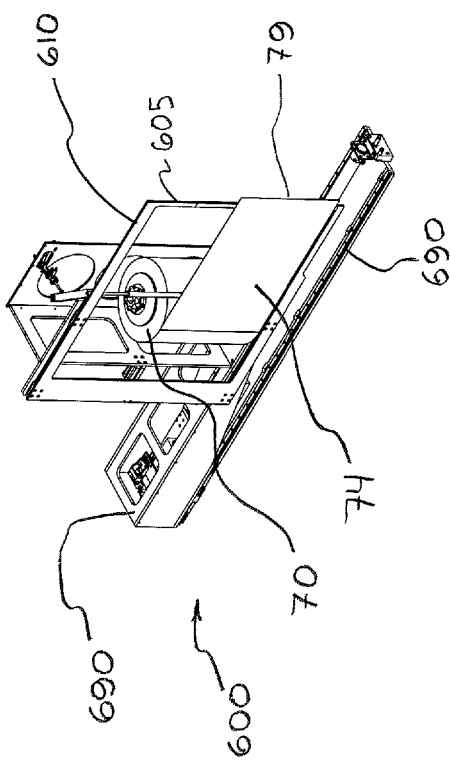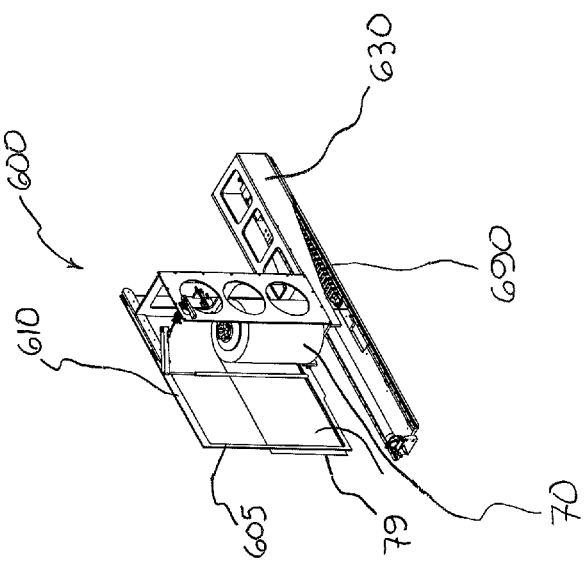

MASKING TECHNOLOGY

FIELD OF THE INVENTION

The present invention relates to removable masking for glazing panes. In particular, this invention relates to machines and processes used to apply removable masking onto such panes.

BACKGROUND OF THE INVENTION

In most industrialized countries, windows touch people's lives every day. Where ever people work and live there are windows. Windows allow the occupants of a building to view the outside world, while allowing sun light to enter the interior of the building. Sunlight is a natural antidepressant and helps the human body produce vitamin D. Thus, a certain amount of sunshine is essential to mental and physical well-being.

In extreme climates, significant energy may be lost through windows during the winter when a building is being heated, and/or during the summer when a building is being cooled. With the high cost of energy, efforts have been made to provide homes and other buildings with insulation that will more efficiently prevent the transfer of heat between the inside and the outside of a building. Multiple-pane insulating glass units ("IGUs") have been developed as an effective way to reduce the amount of heat transfer through windows.

There are basically two types of multiple-pane IGUs in widespread commercial production. These are often referred to as double glazing and triple glazing. Double glazed insulating glass units are the most common. They have a space sealed between two panes. This space provides thermal insulation. The insulating effect can be enhanced by filling the space with an insulative gas mix, e.g., a mix of air and argon or krypton. Alternatively, the space can be evacuated, so as to provide a vacuum IG unit. Compared with a single pane glazing, double glazed IGUs can reduce the heat loss through a window by nearly half. Triple-glazed IGUs (or "triple glazing") can provide even more insulating effect, but are currently less common. They have three panes and two thermal insulation spaces.

Because of the dramatic energy savings that can be achieved with multiple-pane IGUs, building codes in many areas have been revised to require their use. The relative energy performance of these units is an important factor to consider when consumers purchase windows.

The front and rear surfaces of an IGU may be damaged (e.g., scratched) or soiled during storage, handling, transportation to a building site, and/or during the building process (e.g., during installation of the IGU, or during various finishing operations, such as painting, brick washing, etc.). It is therefore desirable to provide removable masking over one or both of the front and rear surfaces of an IGU. Once an IGU has been mounted in its final position and all finishing of the surrounding structures has been completed, the masking can be removed from the IGU to reveal the pristine underlying pane surface.

In the past, various methods and machines have been developed for masking glass panes. Some of these methods and machines have been limited in terms of their production speed, their ability to support made-to-order production, the extent to which they are automated, their ability to securely yet removably place masking film on glass without wrinkles, folds, and/or air bubbles, the manner in which they integrate with upstream or downstream IGU manufacturing equipment, and/or their reliability in terms of not having the machine or certain parts wear prematurely.

It would be desirable to provide masking machines and methods that solve one or more problems attendant in state-of-the-art masking application technology, or that otherwise offer improvements over state-of-the-art masking machines and methods.

BRIEF DESCRIPTION OF THE DRAWINGS

FIGS. 3-10 are a series of top views of a masking head of the machine of FIG. 1, with the series of images depicting a sequence of steps used to apply each strip of masking material to a glazing panel, in accordance with certain embodiments of the invention.

FIG. 20A is a schematic, partially broken-away, perspective detail view of the relative positioning of masking material and a mount to which a web of masking material is temporarily adhered in accordance with certain embodiments of the invention.

FIG. 20B is a schematic, perspective detail view of an air-knife assembly of the machine of FIG. 1.

FIG. 20C is a schematic, partially broken-away, perspective detail view of the masking material and the mount of FIG. 20A.

FIGS. 21A-21F are a series of top views of the masking machine of FIG. 1, with the series of images depicting a sequence of steps used to remove a roll of masking material from a masking applicator head of the machine, in accordance with certain embodiments of the invention.

FIGS. 22A-22F are a series of top views of the masking machine of FIG. 1, with the series of images depicting a sequence of steps used to mount a roll of masking material on the masking applicator head of the machine, in accordance with certain embodiments of the invention.

FIGS. 23A and 23B are perspective detail views of a roll-change device of the masking machine of FIG. 1, with the roll-change device shown in a retracted position without a roll of masking material.

FIGS. 25A and 25B are perspective detail views of the roll-change device of FIGS. 23A and 23B, with the roll-change device shown in an extended position carrying a roll of masking material.

FIGS. 26A-26C are perspective detail views of the roll-change device of FIGS. 23A and 23B, with the roll-change device shown in a retracted position carrying a roll of masking material.

SUMMARY

Figure 1:
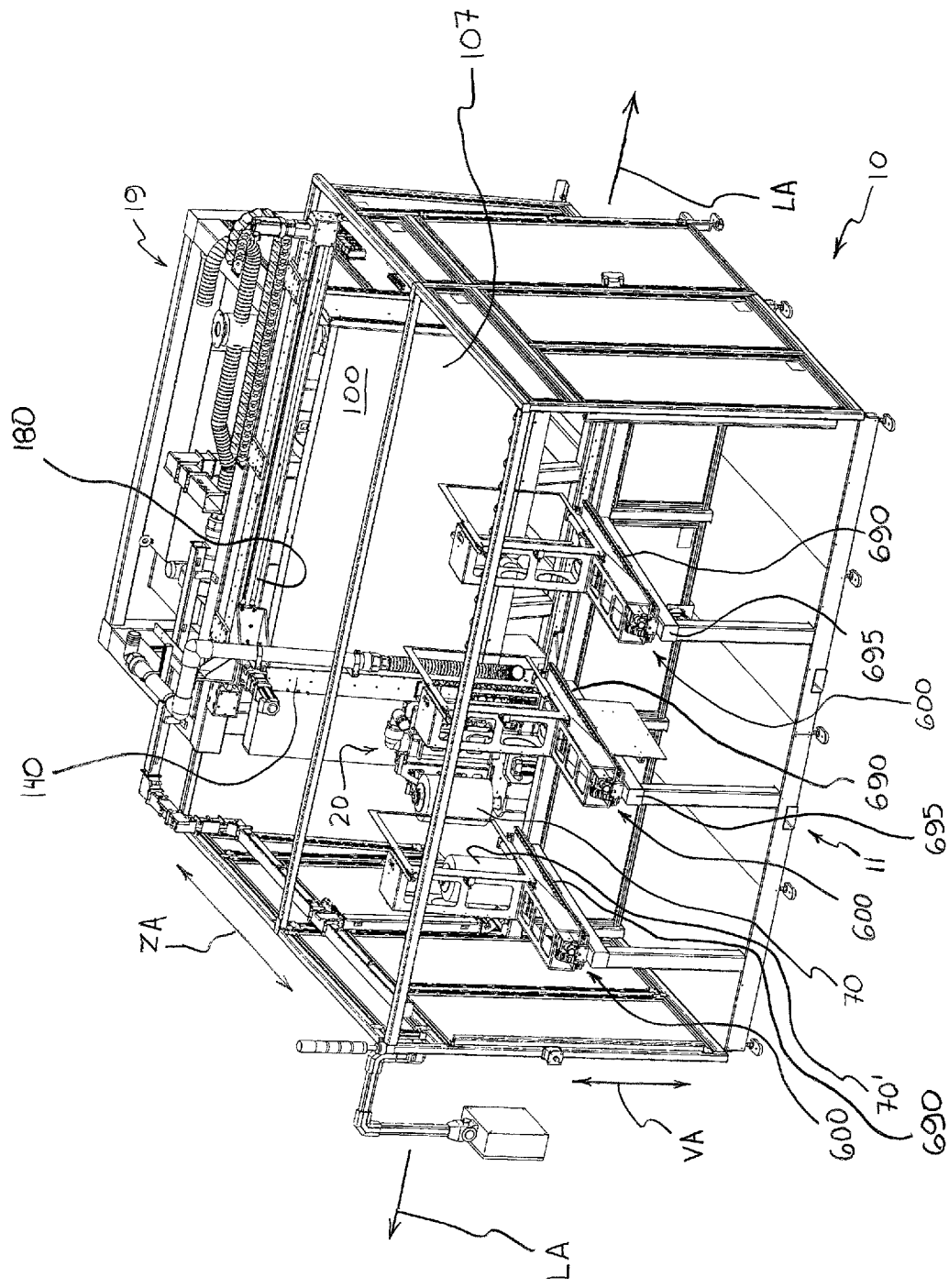
FIG. 1 is a perspective view of a masking machine in accordance with certain embodiments of the present invention.

In some embodiments, the invention provides a method of masking glazing panels using a masking machine having a roller wiper that is simultaneously rotatable about a longitudinal axis of the roller wiper and subject to relative linear motion, with respect to a glazing panel, along a desired axis of the masking machine. The desired axis (which in some cases is a lateral axis) of the masking machine is crosswise to the longitudinal axis of the roller wiper. In the present embodiments, the method comprises providing the glazing panel at a masking station of the machine. The glazing panel has opposed front and rear surfaces. The front surface of the glazing panel is oriented toward the roller wiper. A masking material having opposed first and second faces is provided. In some cases, the first face of the masking material carries an adhesive. The roller wiper is moved toward the glazing panel, so as to press the masking material against the glazing panel such that the first face of the masking material is secured (in some cases, adhesively secured) to the front surface of the glazing panel. A desired length of the masking material is applied to the glazing panel by rolling the roller wiper along the front surface of the glazing panel, thereby securing (in some cases, adhesively securing) the desired length of the masking material to a desired width of the front surface of the glazing panel.

Other embodiments of the invention provide a masking machine for masking glazing panels. The masking machine has a roller wiper that is simultaneously rotatable about a longitudinal axis of the roller wiper and subject to relative linear motion, with respect to a glazing panel having opposed front and rear surfaces, along a desired axis of the masking machine. The desired axis (which in some cases is a lateral axis) of the masking machine is crosswise to the longitudinal axis of the roller wiper. The masking machine has a masking station constructed to receive the glazing panel such that the front surface of the glazing panel is oriented toward the roller wiper. The masking machine is loaded with a roll of masking material that has opposed first and second faces. In some cases, the first face of the masking material carries an adhesive. The roller wiper is movable toward the glazing panel to press the masking material against the glazing panel, such that the first face of the masking material is secured (in some cases, adhesively secured) to the front surface of the glazing panel. The roller wiper is operable to apply a desired length of the masking material to the glazing pane by rolling along the front surface of the glazing panel and thereby securing (in some cases, adhesively securing) the desired length of the masking material to a desired width of the front surface of the glazing panel.

In certain embodiments, the invention provides a method of masking glazing panels using a masking machine having a roller wiper that is simultaneously rotatable about a longitudinal axis of the roller wiper and subject to relative linear motion, with respect to a glazing panel, along a lateral axis of the masking machine. The lateral axis of the masking machine is crosswise to the longitudinal axis of the roller wiper. The present method comprises providing the glazing panel at a masking station of the machine. The glazing panel has opposed front and rear surfaces; the front surface of the glazing panel is oriented toward the roller wiper. The method further comprises providing a masking material having opposed first and second faces. The first face of the masking material carries adhesive. The roller wiper is moved toward the glazing panel so as to press the masking material against the glazing panel such that the first face of the masking material is secured adhesively to the front surface of the glazing panel. A desired length of the masking material is applied to the glazing panel by rolling the roller wiper along the front surface of the glazing panel, thereby adhesively securing the desired length of the masking material to a desired width of the front surface of the glazing panel.

Some embodiments provide a masking machine for masking glazing panels. In a first group of embodiments, the masking machine has a roller wiper that is simultaneously rotatable about a longitudinal axis of the roller wiper and subject to relative linear motion, with respect to a glazing panel having opposed front and rear surfaces, along a lateral axis of the masking machine. The lateral axis of the masking machine is crosswise to the longitudinal axis of the roller wiper. The masking machine has a masking station constructed to receive the glazing panel such that the front surface of the glazing panel is oriented toward the roller wiper. The masking machine is loaded with a roll of masking material that has opposed first and second faces. The first face of the masking material carries adhesive. The roller wiper is movable toward the glazing panel to press the masking material against the glazing panel such that the first face of the masking material is secured adhesively to the front surface of the glazing panel. The roller wiper is operable to apply a desired length of the masking material to the glazing pane by rolling along the front surface of the glazing panel and thereby adhesively securing the desired length of the masking material to a desired width of the front surface of the glazing panel.

DETAILED DESCRIPTION

The following detailed description is to be read with reference to the drawings, in which like elements in different drawings have like reference numerals. The drawings, which are not necessarily to scale, depict selected embodiments and are not intended to limit the scope of the invention. Skilled artisans will recognize that the examples provided herein have many useful alternatives that fall within the scope of the invention.

The present invention provides a machine configured to perform automated application of masking material (e.g., masking film) to glazing panels. FIG. 1 depicts one exemplary embodiment of the masking machine 10. The machine 10 has a masking station constructed to receive a glazing panel 200. The panel 200 can be a monolithic pane or a multiple-pane insulating glazing unit ("IGU"). Either way, the panel 200 has opposed front 210 and rear 220 surfaces, and is provided at the masking station of the machine 10 such that the front surface 210 of the panel is ready to be masked. FIG. 1 depicts an embodiment of the masking machine 10 wherein glazing panels are conveyed and processed (i.e., masked) in an upright (e.g., generally vertical) position. The machine, however, can alternatively be embodied such that the glazing panels are conveyed and processed in a generally horizontal position.

The masking machine 10 preferably has a substrate transport system 170. In the embodiment illustrated, the transport system 170 is adapted for maintaining a glazing panel 200 in a vertical-offset configuration wherein the panel is not in a perfectly vertical position but rather is offset from vertical by an acute angle. This angle is less than 15 degrees, and preferably less than 10 degrees. In some cases, the angle is between 5 degrees and 10 degrees. In one non-limiting example, the angle is about 7 degrees. In the embodiment illustrated, the angle is offset from vertical such that the glazing panel 200 is conveyed and masked in a "leaned back" configuration. In this configuration, a top edge 208 of the glazing panel 200 is slightly closer (along the Z axis ZA) to the rear 19 of the machine 10 than is the bottom edge 204 of the panel.

In the embodiment of FIG. 1, the transport system 170 defines a path of substrate travel extending along a lateral axis LA of the masking machine 10. Preferably, the path of substrate travel extends between a machine inlet and a machine outlet. In some cases, an optional upstream conveyor is configured to deliver unmasked glazing panels from an upstream series of IGU assembly machines to the masking machine (e.g., via the machine inlet), and/or an optional downstream conveyor is configured to deliver masked glazing panels away from the masking machine (e.g., via the machine outlet).

As noted above, the illustrated transport system 170 is adapted for moving (e.g., conveying) the glazing panel 200 along the path of substrate travel while maintaining the panel in a vertical-offset configuration. Thus, the transport system 170 preferably includes a rear support 100 and a bottom conveyor 90.

When a glazing panel 200 is conveyed along the transport system 170, the panel's rear surface 220 is supported by (optionally by being in direct physical contact with) the rear support 100. The rear support 100 can be provided in different forms. For example, it can comprise a platen, framework, or both. FIG. 1 exemplifies a preferred embodiment wherein the rear support 100 comprises a platen. Here, the platen defines a front surface 107 alongside which the glazing panel 200 can be carried (e.g., against which the panel can slide) during conveyance of the panel and/or during masking of the panel. When provided, the platen can advantageously have a flat (e.g., planar) front surface 107 with an area sufficient to accommodate glazing panels of various sizes. The front surface 107, for example, can advantageously have a surface area of at least 20 square feet, and perhaps more preferably at least 30 square feet. In one non-limiting example, front surface 107 has a surface area of from 30 to 84 square feet.

If desired, the rear support 100 (whether comprising a platen, a framework, or both) can comprise a plurality of rotatable bodies adapted to roll against the panels' rear surface 220 when the panel 200 is conveyed along the path of substrate travel. When provided, such rotatable bodies may be mounted in a fixed positions relative to (e.g., on) the rear support 100. Each such rotatable body can optionally be mounted in a fixed location where it is adapted to rotate about a generally vertical axis. Thus, the rear support 100 can optionally comprise a plurality of rotatable wheels. Additionally or alternatively, the rear support 100 can comprise a plurality of casters, which are free to rotate in any direction. Such wheels and/or casters can be provided as an arrangement (e.g., a matrix) wherein they are spaced vertically and horizontally from one another. When provided, the wheels are oriented so their direction of rotation corresponds to the desired direction of substrate travel (e.g., such wheels preferably are adapted for rotation about a common axis). Another option is to provide the rear support 100 with an air cushion (e.g., a plurality of nozzles providing an air cushion) for supporting the rear surface 220 of the glazing panel 200 during conveyance. In the illustrated embodiment, though, the flat front surface 107 is devoid of wheels, casters, and air nozzles adapted to provide an air cushion. Thus, the rear surface 220 of the panel 200 simply slides along the flat front surface 107 of the platen shown. In one non-limiting example, the platen is constructed of aluminum plate covered with polyester fabric impregnated with polyurethane covering, which is advantageous for enabling the glazing panel 200 to slide readily along the flat front surface 107 without being scratched.

In the embodiment of FIG. 1, the masking machine 10 has an upright platen 100 and a horizontal conveyor 90 configured to convey glazing panels along a lateral axis LA of the machine. This is perhaps best seen in FIG. 2, which depicts the substrate transport system 170 in isolation. Here, the platen 100 is adapted to support the rear surface 220 of the glazing panel 200 while the conveyor 90 simultaneously supports a bottom edge 204 of the panel. The conveyor 90 can be, for example, a single endless conveyor belt or multiple conveyor sections.

Figure 2:
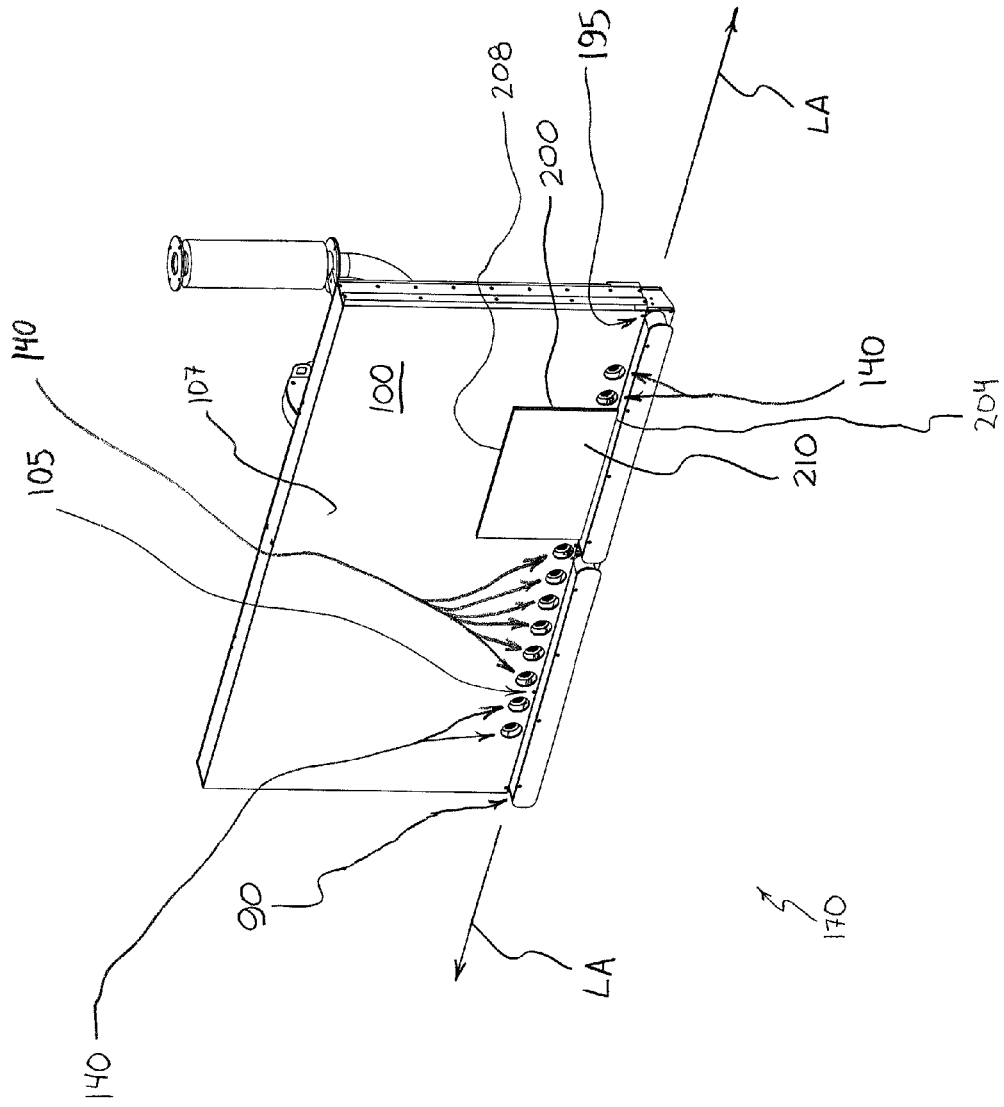
FIG. 2 is a perspective view of a substrate transport system of the masking machine of FIG. 1.

The masking machine 10 can optionally include an automated sensor that detects the presence of the glazing panel 200 at a position on the lateral axis LA of the masking machine. In such cases, the conveyor 90 is operable to move the glazing panel along the lateral axis LA of the masking machine 10 until the glazing pane moves to the position where a leading or trailing edge of the glazing panel can be detected by the sensor. At this time (or at a certain time thereafter), the conveyor can be stopped, thereby positioning the glazing panel in a desired position at the masking station. If desired, the sensor can be on the platen. Reference is made to FIG. 2, wherein there are two such sensors (or "registration eyes"), identified by reference numbers 105 and 195. While each illustrated sensor is located on the platen, this is not required. Each sensor can advantageously be a photoelectric sensor. Instead of having one or more sensors of this nature, the masking machine can include a physical stop (e.g., a bar, shoulder, or other body) that moves into the panel's path of travel such that the panel strikes the physical stop, and is thereby held in place, upon reaching the desired position.

The conveyor 90 shown in FIG. 2 has two servos adapted respectively to drive the two illustrated conveyor sections. There are also two registration eyes: a leading registration eye 105 and a trailing registration eye 195. These registration eyes 105, 195 are used to register the IG unit 200. Depending upon the size of the particular unit being processed, either the leading registration eye 105 or the trailing registration eye 195 is used to register the IG unit. This allows placing an IG unit on the upstream conveyor section so as to reduce conveyance times when processing IG units that fit on a single conveyor section. When processing a larger IG unit that requires both conveyors, the two conveyors are "geared" together and act as a single conveyor. It is to be appreciated that these details are by no means limiting. For example, there could simply be one conveyor section, if so desired. There could be only a single registration eye. Or there could be no registration eyes. For example, a physical stop may be used, as noted above.

The rear support 100 preferably includes at least one suction mechanism 140 (each optionally comprising a suction cup). In FIG. 2, the platen has a series of suction mechanisms 140 located along the lateral axis LA. Each of the illustrated suction mechanisms 140 comprises an opening in the front surface 107 of the platen 100. The suction mechanisms 140 are adapted to engage the rear surface 220 of the glazing panel 200 by applying suction to this surface, so as to retain the panel in a stationary position while the panel is masked. In the illustrated embodiment, multiple suction mechanisms 140 are spaced-apart along the lateral axis LA of the masking machine. To accommodate different size glazing panels, and/or to enable glazing panels to be processed at different locations on the conveyor 90, the suction mechanisms 140 can advantageously be spaced along at least 50% of the width (as measured along lateral axis LA) of the platen. In one non-limiting example, the suction mechanisms 140 collectively span at least five feet, such as in the range of 7-12 feet (as measured between the upstream-most end of the upstream-most suction mechanism and the downstream-most end of the downstream-most suction mechanism) along the lateral axis LA. In FIG. 2, the suction mechanisms 140 are located adjacent to the conveyor 90, i.e., in a bottom edge region of the platen 100. The illustrated suction mechanisms 140 each comprise a circular suction cup, although this is by no means required.

The glazing panel 200 has opposed front 210 and rear 220 surfaces, and is provided at the masking station of the machine 10. In the embodiment of FIG. 1, the glazing panel 200 is provided at the masking station of the machine 10 by conveying the panel to the masking station.

Figure 14:
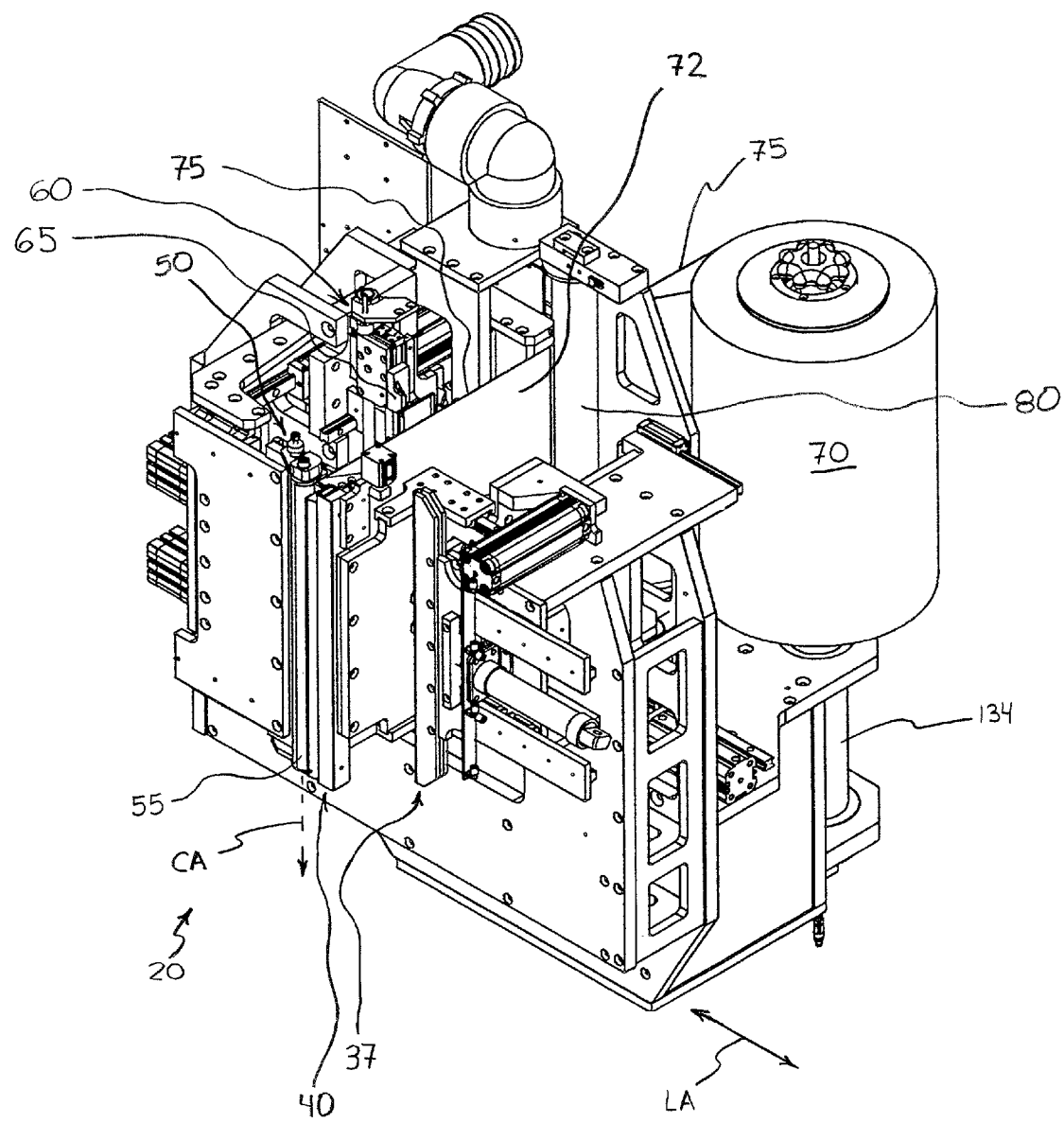
FIG. 14 is another perspective view of the masking head of the machine of FIG. 1.
Figure 15:
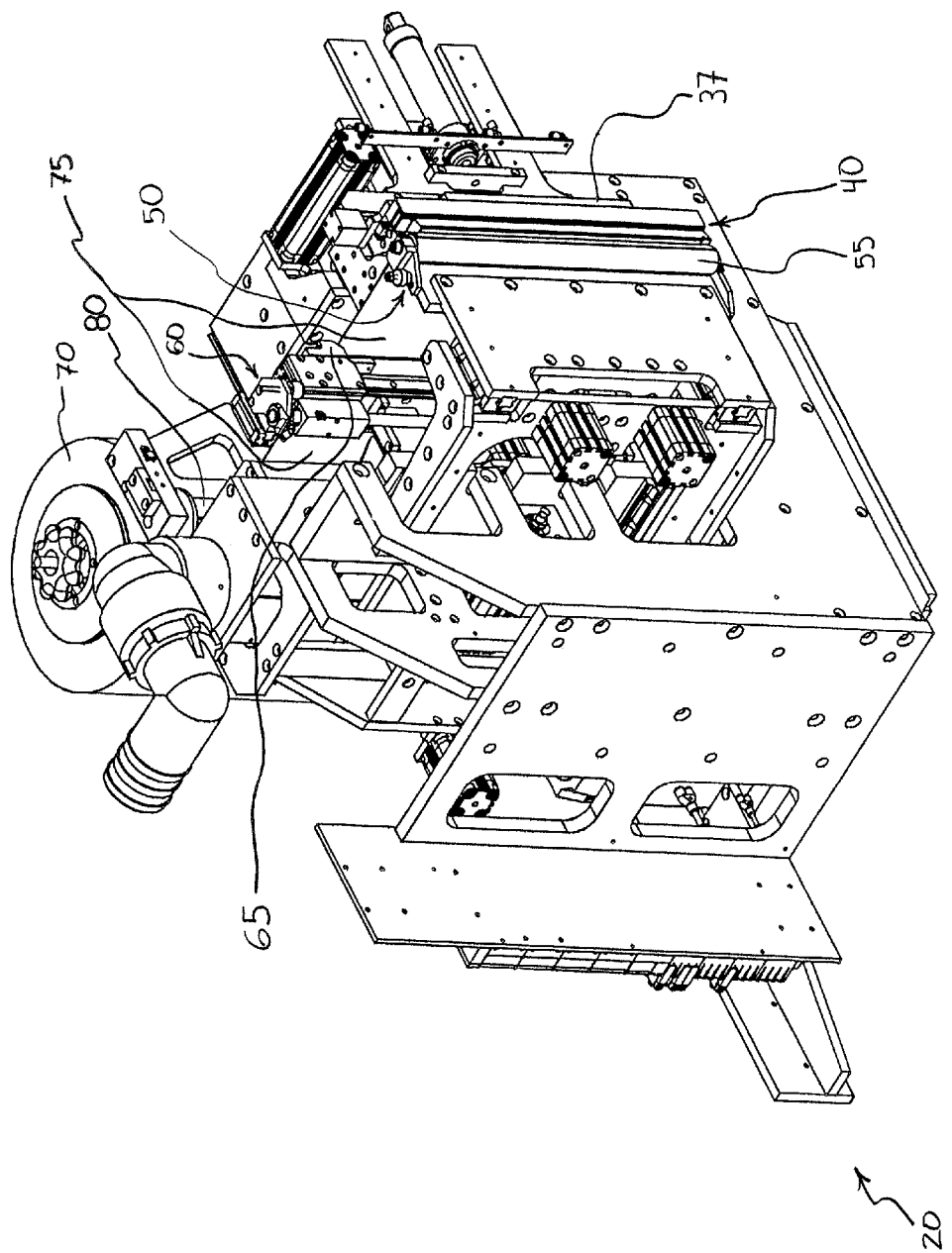
FIG. 15 is yet another perspective view of the masking head of the machine of FIG. 1.

In a first group of embodiments, the masking machine 10 has a roller wiper 55. The roller wiper 55 has a longitudinal axis CA about which the wiper is rotatable. This is perhaps best appreciated by referring to FIG. 14. While the longitudinal axis CA of the illustrated roller wiper 55 is oriented substantially vertically (e.g., in a vertical-offset configuration), it can alternatively be oriented horizontally or at any other desired angle. The roller wiper 55 is adapted to roll over the front surface 210 of the glazing panel 200 (i.e., while the roller wiper and the glazing panel are subjected to relative linear motion with respect to each other) so as to apply a desired length of masking material 75 onto the front surface of the glazing panel. During this application, the masking material (e.g., masking film) 75 is sandwiched between the roller wiper 55 and the front surface 210 of the glazing panel 200, as described below with reference to FIGS. 3-10.

In some cases, the roller wiper 55 is simultaneously rotatable about its longitudinal axis CA and moveable linearly along a desired axis of the masking machine 10 while the glazing panel 200 is maintained in a stationary position (e.g., on the platen or other support 100). In other cases, the roller wiper 55 is configured to simply rotate about its longitudinal axis CA (i.e., without moving linearly along the desired axis) while the glazing panel 200 moves linearly along the desired axis of the masking machine 10. In still other cases, both the roller wiper 55 and the glazing panel 200 move linearly (e.g., in opposite directions) along the desired axis while the roller wiper rotates about its central axis CA. Thus, regardless of the particular manner in which the relative linear motion is carried out, it can be appreciated that the roller wiper 55 is simultaneously: (i) rotatable about its longitudinal axis CA, and (ii) subject to relative linear motion, with respect to a glazing panel 200, along a desired axis of the masking machine 10. In the embodiment illustrated, the desired axis is the lateral axis LA of the masking machine. The masking machine, however, can alternately be embodied such that roller wiper rolls up, down, or both when applying the masking material to glazing panels. In such cases, the desired axis may be a vertical-offset axis.

Figure 3:
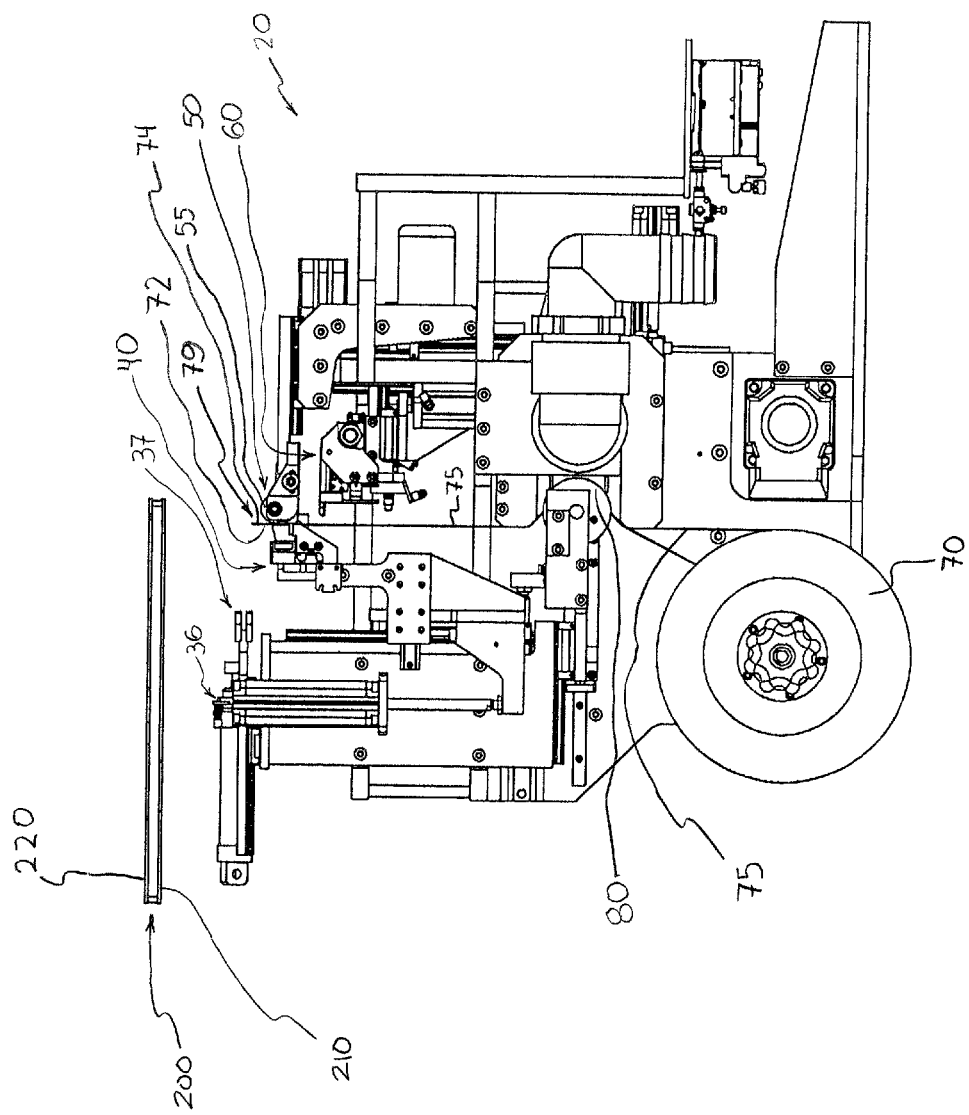

As is perhaps best appreciated by referring to FIGS. 1-3, when a glazing panel 200 is at the masking station of the machine 10, the front surface 210 of the panel preferably is oriented toward (e.g., faces) the roller wiper 55. In the embodiment illustrated, the longitudinal axis CA of the roller wiper 50 is crosswise (e.g., perpendicular) to the lateral axis LA of the masking machine 10. This is perhaps best seen in FIG. 14. In FIGS. 1, 3-10, 12-16, 18, 19, 21A, 21B, 22E, and 22F, the masking machine 10 is loaded with (e.g., carries) a roll 70 of masking material 75. Here, the roll 70 of masking material 75 is mounted on (e.g., carried by) the masking head 20 of the machine 10. The masking material 75 has opposed first 72 and second 74 faces. Preferably, the first face 72 of the masking material 75 carries an adhesive. In other cases, the masking film is simply secured to the glazing panel by static cling, or by providing the first face with a surface treatment (i.e., not involving an adhesive) that enables the masking film to cling to the panel surface 210. The illustrated roller wiper 50 is movable toward the glazing panel 200 to press the masking material 75 against the panel such that the first face 72 of the masking material is secured (in some cases, adhesively) to the front surface 210 of the panel.

In the embodiment illustrated, the glazing panel 200 is masked while in an upright position. As noted above, however, the machine can alternatively be configured such that the glazing panel is masking while in a horizontal position. In such embodiments, the roller wiper can be configured to move toward and away from the glazing panel by moving along a vertical axis. In these embodiments too, the roller wiper is simultaneously: (i) rotatable about its longitudinal axis, and (ii) subject to relative linear motion, with respect to the glazing panel being masked, along a desired axis of the masking machine.

In the illustrated embodiment, the roller wiper 50 is moveable toward and away from the platen or other rear support 100 of the machine (e.g., along the Z axis ZA), in addition to being rotatable about its central axis CA. As noted above, in some cases, the roller wiper 50 is also moveable linearly (e.g., together with the rest of the masking head 20) along a lateral axis LA of the machine 10. Furthermore, in the embodiment illustrated, the roller wiper 50 is moveable linearly (e.g., together with the rest of the masking head 20) along an upright axis, i.e., along a Y axis VA of the machine. Reference is made to FIG. 1. Here, the roller wiper 50 is configured to move linearly in an upward direction, which is perpendicular to its direction of relative lateral linear motion during application of masking material to a glazing panel. It is to be appreciated, however, that the present roller wiper could alternatively be used in an embodiment where the masking machine is adapted to apply only a single piece of masking material to cover the whole front surface 210 of a standard panel size. In such cases, the roller wiper need not be movable along the Y axis of the machine. Furthermore, the masking application can involve the glazing panel moving linearly while the roller wiper simply rotates about its central axis (i.e., without the roller wiper moving linearly). Thus, the roller wiper 50 need not be adapted to move linearly along a lateral axis LA of the machine 10.

The roller wiper 50 is constructed to apply a desired length of masking material 75 to the glazing panel 200 by rolling over the front surface 210 of the panel and thereby securing (in some cases, adhesively securing) the desired length of the masking material to a desired width of the front surface of the panel. This is perhaps best understood by referring to FIGS. 3-10, which will now be described.

FIGS. 3-10 depict an exemplary masking head 20 construction at various stages of use in applying a piece (e.g., a strip) of masking material 75 onto a front surface 210 of a glazing panel 200. In the embodiment illustrated, the masking head 20 includes a roll 70 of masking material 75, a roller wiper assembly 50, an air-knife assembly 40, a cutter assembly 60, a cutting board assembly 37, and a corona treatment device 80.

FIG. 3 depicts a glazing panel 200 (of the double glazed IGU variety) that is staged and ready to be masked. For clarity of illustration, the rear support 100 and conveyor 90 of the masking machine 10 are not shown. It will be appreciated, however, that the glazing panel 200 of FIGS. 3-10 is supported by one or both such devices 90, 100. In some cases, the glazing panel 200 may have its bottom edge 204 resting on the conveyor 90, while the rear surface 220 of the panel rests against the rear support 100. If desired, the rear support 100 can have one or more suction mechanisms 140 to secure the glazing panel 200 in a stationary position during masking. In such cases, the conveyor 90 may or may not simultaneously support the bottom edge 204 of the glazing panel (e.g., the suction cups may hold the panel in a position spaced above the conveyor, in which case the conveyor may retract away from the glazing panel).

Figure 4:
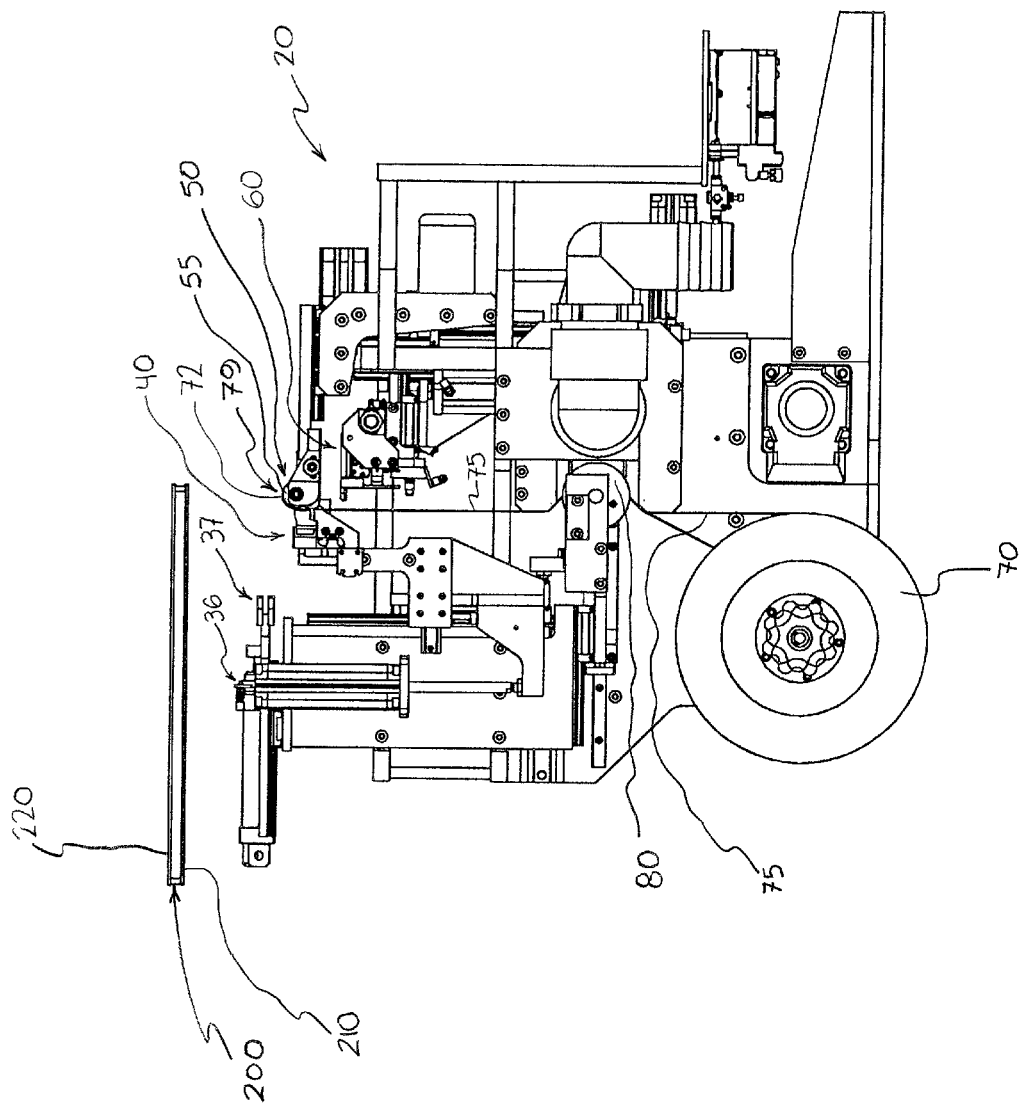

In FIG. 3, a leading region of the masking material 75 is held (e.g., sandwiched) between the air-knife assembly 40 and the roller wiper assembly 50, such that a leading end 79 of the masking material projects outwardly (e.g., away from the masking head 20) and terminates at a free edge, which is spaced a distance from both the air-knife assembly 40 and the roller wiper assembly 50. The air-knife assembly 40 is actuated to blow the leading end 79 of the masking material 75 onto the roller wiper 55. This wraps the leading end 79 around an exposed portion of the roller wiper's diameter. More will be said of this later, e.g., with respect to FIGS. 16 and 17. FIG. 4 shows the resulting position of the leading end 79 of the masking material 75.

Figure 5:
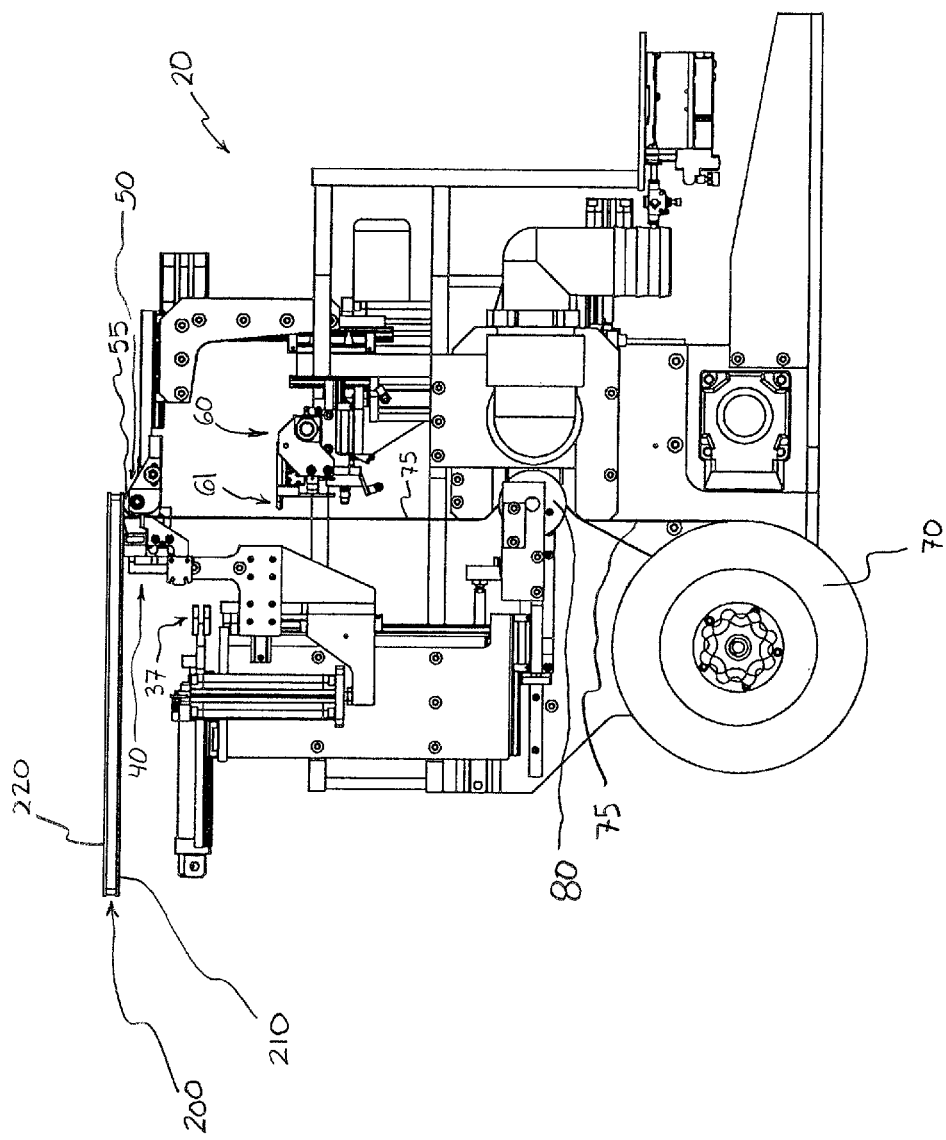

In FIG. 4, it can be appreciated that the non-adhesive side 74 of the masking material 75 is carried against the roller wiper 55, while the adhesive side 72 is exposed (e.g., faces the glazing panel 200). The air-knife assembly 40 and the roller wiper assembly 50 then move conjointly toward the glazing panel 200 until the adhesive side 72 of the masking film's tail end 79 is pressed against, and thereby adhered to, the front surface 210 of the glazing panel. The resulting position is shown in FIG. 5.

Figure 6:
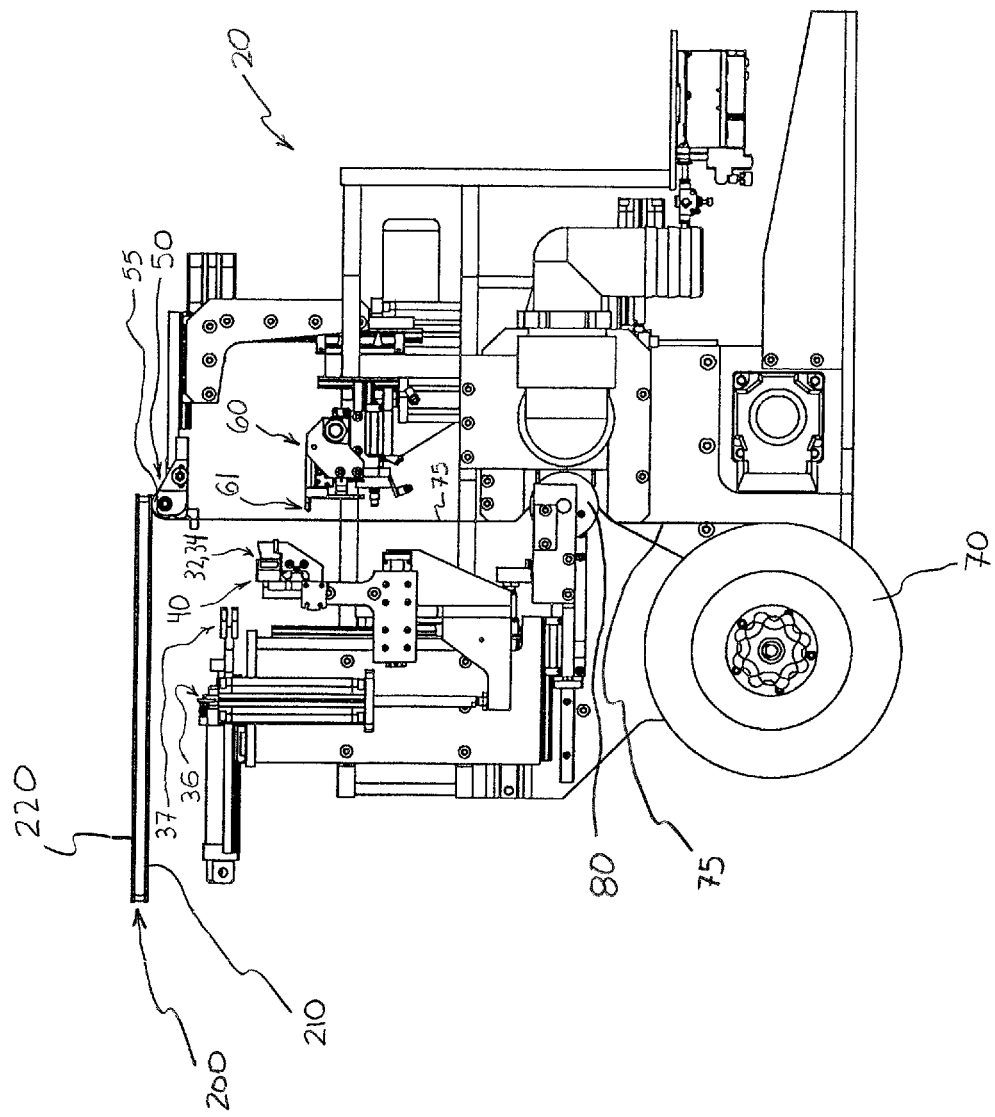
Figure 7:
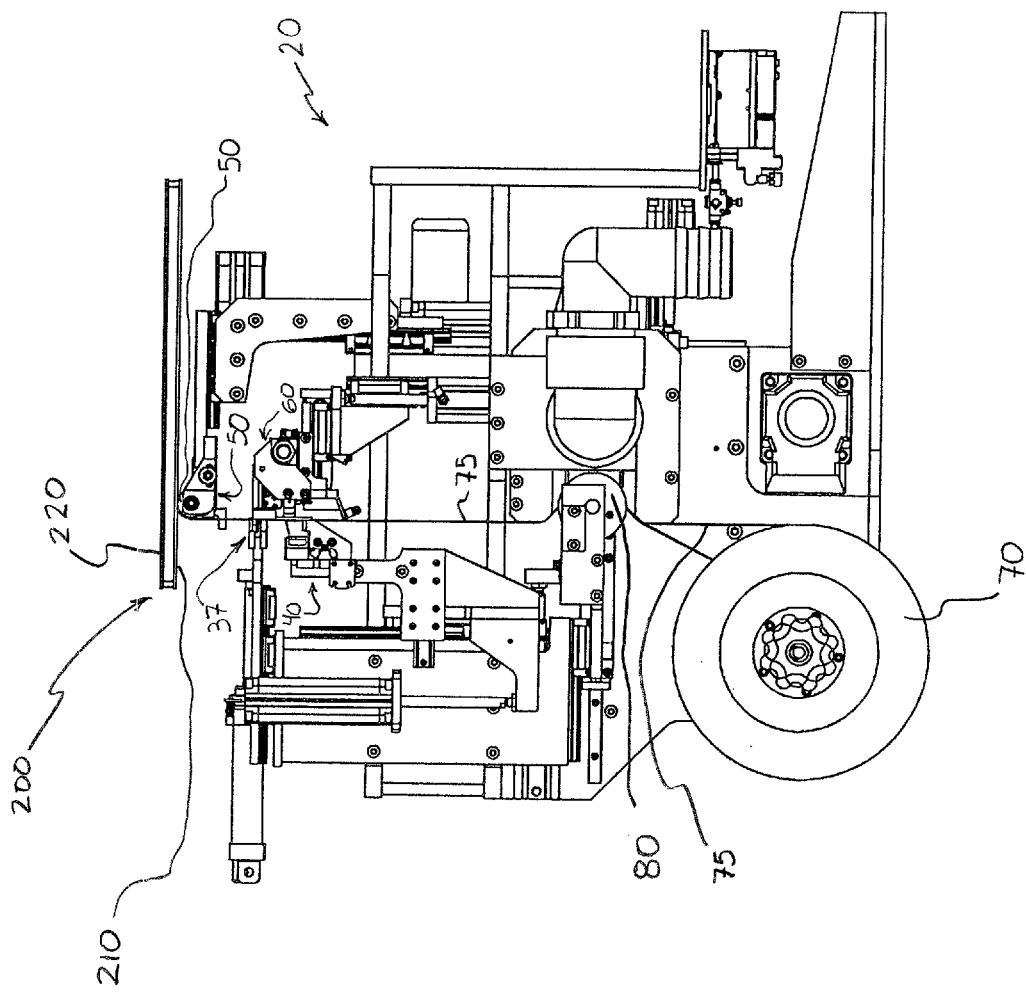

The air-knife assembly 40 then retracts away from the glazing panel 200 into the position shown in FIG. 6. At this stage, the machine 10 and glazing panel 200 are ready for application of an elongated length ("a desired length") of the masking material 75 onto the front surface 210 of the glazing panel. This is done by subjecting the roller wiper 55 to relative linear motion (along a lateral axis LA) with respect to the glazing panel 200. As noted above, this relative linear motion may involve the roller wiper 55 moving linearly while the panel 200 is held stationary, or the panel may move linearly while the roller wiper is held in a stationary linear position on the lateral axis, or both may move linearly (e.g., at the same time, or in sequence). In some cases, suction mechanisms 140 on the platen or other support 100 are operated to hold the glazing panel 200 in a fixed position while the roller wiper 55 moves linearly along the lateral axis LA.

Figure 8:
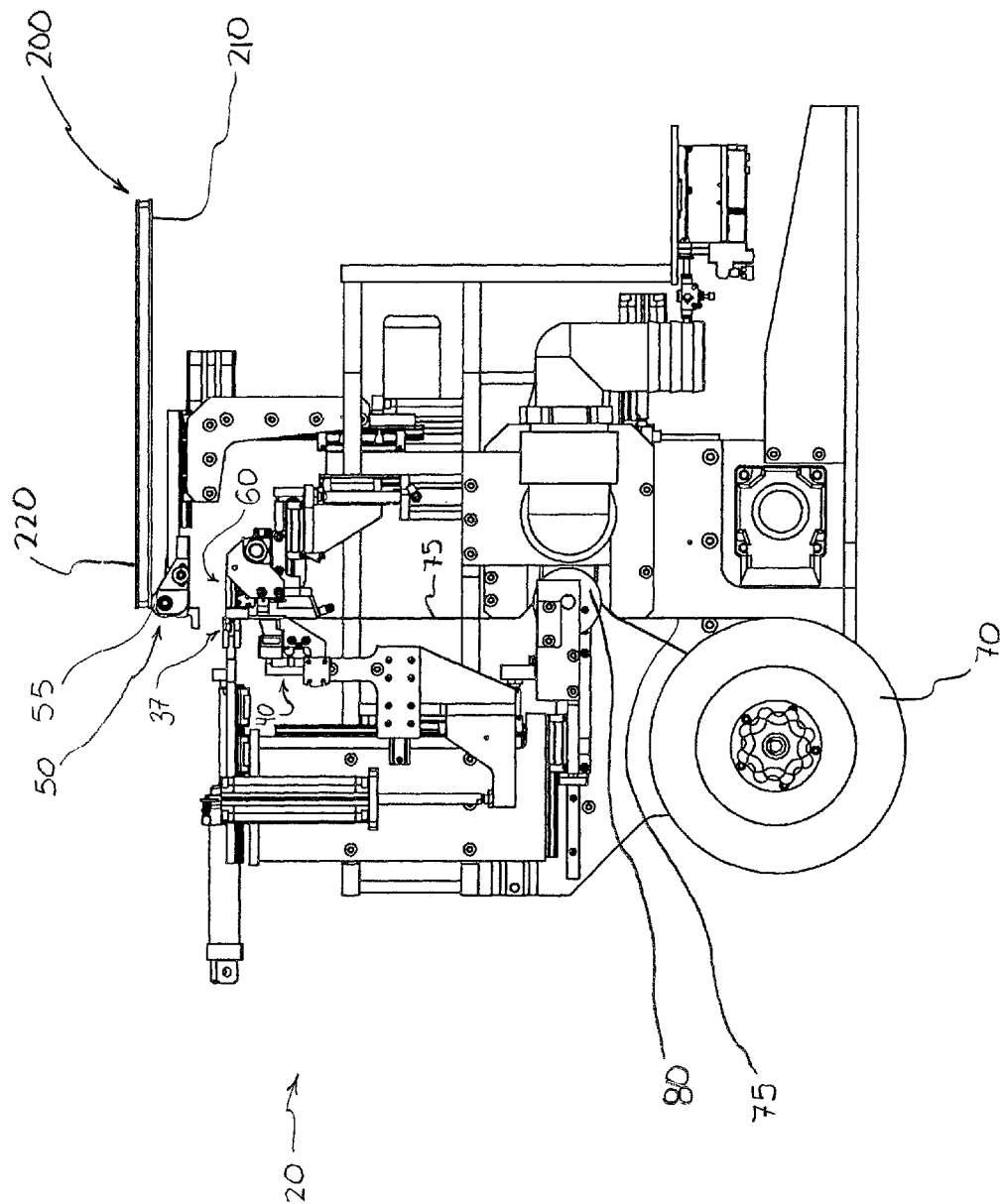
Figure 11A:
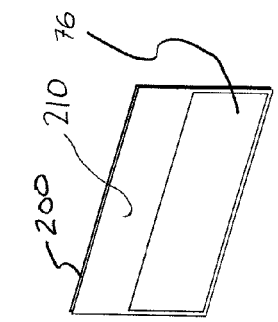
FIGS. 11A-11H are a series of perspective views schematically showing the application of multiple sequentially overlapped strips of masking material onto a glazing panel in accordance with certain embodiments of the invention.
Figure 11B:
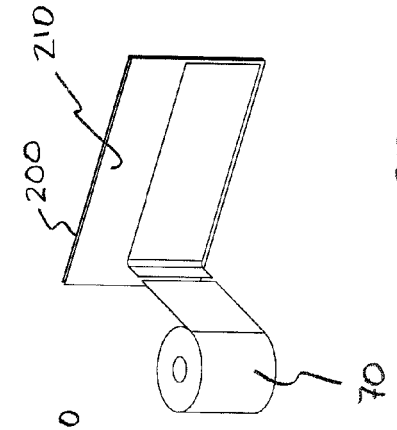
Figure 11C:
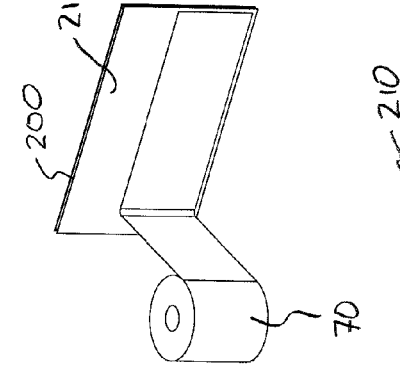
Figure 11D:
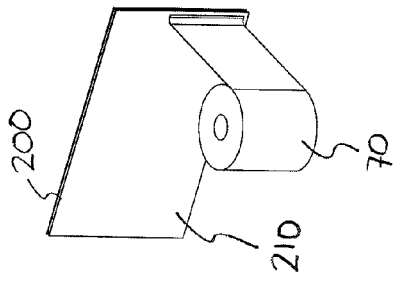
Figure 11E:
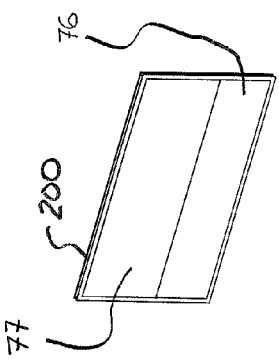
Figure 11F:
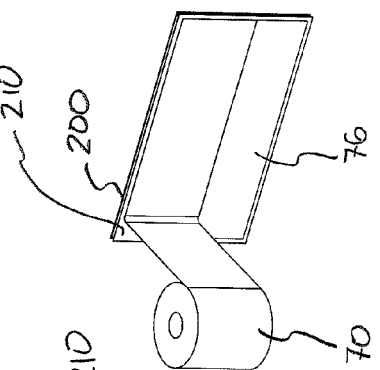
Figure 11G:
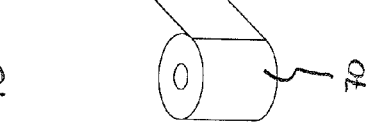
Figure 11H:
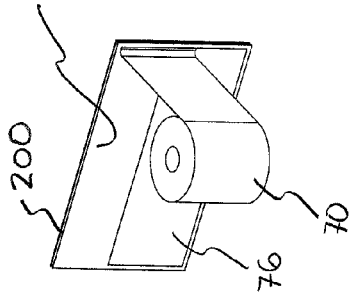

Regardless of the particular manner in which relative linear motion is carried out, the roller wiper 55 rolls along the front face 210 of the glazing panel 200 and thereby applies an elongated length of the masking material 75 onto the glazing panel. This relative linear motion and the resulting masking application can be appreciated by referring to FIGS. 6-8. The masking material 75 is cut before the end of application. Thus, in FIG. 7, the cutting assembly 60 and cutting board assembly 37 have been moved together, and the desired length of masking material 75 is cut from the web of masking material attached to the roll 70. Preferably, this cutting is carried out by moving a razor blade of the cutting assembly 60 along the cutting board assembly 37 while the masking material 75 is retained between the cutting assembly and the cutting board assembly. As shown in FIG. 8, the rest of the desired length of masking material is then rolled onto the front surface 210 of the glazing panel 200. The cutter assembly 60 and cutting board assembly 37 are then retracted, leaving the cut end of the film adhered to the air-knife assembly 40. This is best appreciated in FIGS. 9 and 19C. The roller wiper assembly 50 and the cutter assembly 60 are then moved away from the glazing panel 200, as shown in FIG. 10. The glazing panel 200 can then be conveyed from the machine 10, or if another strip of masking material 75 is to be applied to the glazing panel, then the masking head 20 can once again be configured as shown in FIG. 3, and the process repeated, so as to apply a second strip of the masking material 75. If three or more masking strips are desired, then the process is repeated the appropriate number of times.

Thus, in the embodiment illustrated, the masking machine 10 is operable to apply a plurality of sequentially overlapped strips of masking material 75 onto a glazing panel 200. This can be done by making at least two successive passes of the roller wiper 55 along the front surface 210 of the glazing panel 200. FIGS. 11A-11H schematically depict the application of two such strips 76, 77. Here, it can be appreciated that the resulting masked surface 210 of the glazing panel 200 has an unmasked apron extending along (e.g., entirely around) a perimeter of surface 210. This surface 210 of the glazing panel 200 may be entirely covered by the masking material except for such an unmasked apron extending (entirely or partway) along a perimeter of surface 210. While not strictly required, this may be the case regardless of whether one, two, or more strips of masking material are applied. When provided, the unmasked apron may have a width (i.e., the distance from the outermost edge of the masking material to the adjacent edge of the glazing panel) of up to two inches, such as about 0.5 inch, about 1 inch, about 1.5 inches, or about 2 inches. Thus, the application of each piece of masking material can optionally involve placing each piece on the glazing panel so as to leave an unmasked apron between one or more (in some cases, between each of the) outermost edges of that masking piece and an adjacent edge of the glazing panel.

It is not required, however, that the masking machine be adapted to apply sequentially overlapped strips of masking material. For example, a roller wiper system in accordance with the present disclosure can be incorporated quite advantageously into a masking machine embodiment that is adapted to simply apply a single piece of masking material to cover the entire masked area of the front surface 210 of each glazing panel to be masked on the machine.

Insofar as the glazing panel 200 is concerned, it can be a monolithic pane or a multiple-pane insulating glazing unit (e.g., a double or triple glazed IGU). The glazing panel 200 will typically comprise one or more glass panes. Glazing panels of many different sizes can be masked using the machine 10. Commonly, large-area panels are used. Some examples involve a panel having a length and/or width of at least 0.5 meter, preferably at least 1 meter, perhaps more preferably at least 1.5 meters (e.g., between 2 meters and 4 meters). In some cases, the panel is (or comprises) a glass sheet having a length and width that are each between 0.5 meter and 3 meters.

Panes of various thicknesses can be used in (or as) the glazing panel 200. Generally, the glazing panel 200 will comprise one or more panes (optionally formed of glass) having a thickness of from 1-12 mm. In some cases, the pane or panes each have a thickness of from 2 to 5 mm, such as from 2.3 to 4.8 mm, or from 2.5 to 4.8 mm. In one non-limiting example, a sheet of glass (e.g., soda-lime glass) having a thickness of about 3 mm is used. If desired, the glazing panel can alternatively comprise one or more polymer sheets.

In many cases, each pane of the glazing panel 200 will be transparent to visible light. Such a glazing panel 200, for example, preferably has a total visible transmittance of greater than 0.35, perhaps more preferably about 0.4 or greater, and in some cases from 0.5 to 0.8. It is to be appreciated, however, that the glazing panel 200 can in some cases be opaque (e.g., in the case of a spandrel panel) or switchable between transparent and opaque states (e.g., in the case of a privacy glazing panel).

Insofar as the masking material 75 is concerned, it preferably comprises a polymer masking film having an adhesive on one side (i.e., on its first face 72), with no adhesive on the other side (i.e., on its second face 74). The thickness of the masking film can be, for example, between about 0.0005 inch and about 0.01 inch, such as between about 0.001 inch and about 0.005 inch. When provided, the adhesive can optionally be a pressure-sensitive adhesive. In one non-limiting example, the masking film is a polyethylene film (e.g., MDPE) with a thickness of about 0.003 inch and having a pressure-sensitive acrylic adhesive on its first face 72. Protective film of this nature is commercially available from Poli-Film America Inc. of Hampshire, Ill. U.S.A.

In the embodiment of FIG. 1, the masking machine 10 has a masking applicator head 20, an upright beam (e.g., vertical beam) 140, and two horizontal beams 180. Here, the masking applicator head 20 is mounted so as to be moveable (e.g., vertically) along the upright beam 140, and the upright beam is mounted so as to be moveable horizontally along the two horizontal beams 180. This allows the head 20 to be moved relative to the glazing panel 200 to different elevations (e.g., moved vertically), horizontally, or both. It is to be appreciated that, to accommodate a vertical-offset configuration of the nature described above, the vertical beam 140 can be offset slightly from a precisely vertical orientation. The same is true of the vertical axis VA, and movement along that axis. Thus, the vertical beam, the vertical axis VA, and the vertical movement described herein can be offset slightly (by an angle of no more than 15 degrees) from exact vertical. The illustrated upright beam 140 is perpendicular to the two horizontal beams 180.

Figure 16:
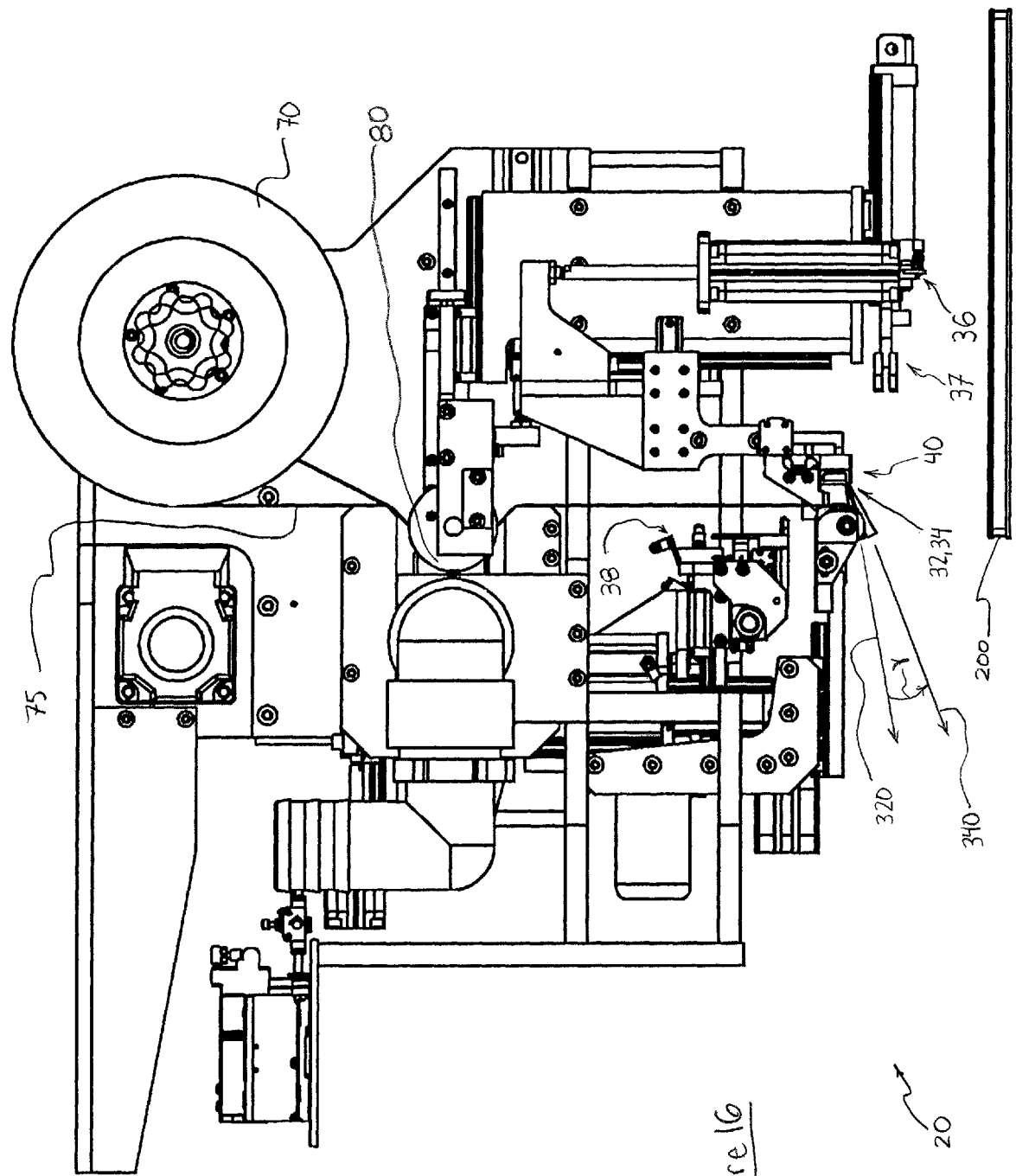
FIG. 16 is a top view of the masking head of the machine of FIG. 1, with schematic depiction of operation of two air nozzles on the masking head.

The illustrated masking machine 10 is configured to lay a leading end 79 of the masking material 75 onto the roller wiper 55. This preferably is done in a manner that avoids wrinkles and folds in the masking material. Reference is made to FIGS. 3, 4, and 16, which depict one exemplary manner in which the leading end 79 of the masking material 75 can be laid across the roller wiper 55 in a controlled fashion. Here, the masking machine 10 includes a first nozzle 32 and a second nozzle 34. The first 32 and second 34 nozzles are operable to lay a leading end 79 of the masking material 75 around a desired circumferential extent of the roller wiper 50 by delivering first and second air streams that blow the leading end of the masking material around the desired circumferential extent of the roller wiper. The first 32 and second 34 nozzles are oriented to direct air streams respectively along first 320 and second 340 axes, which preferably are offset from each other by a positive, acute angle g. This is best seen in FIG. 16, in which two elongated triangles are shown emanating respectfully from the first 32 and second 34 nozzles. These triangles are intended to schematically depict two air flow streams from the two nozzles.

Figure 17:
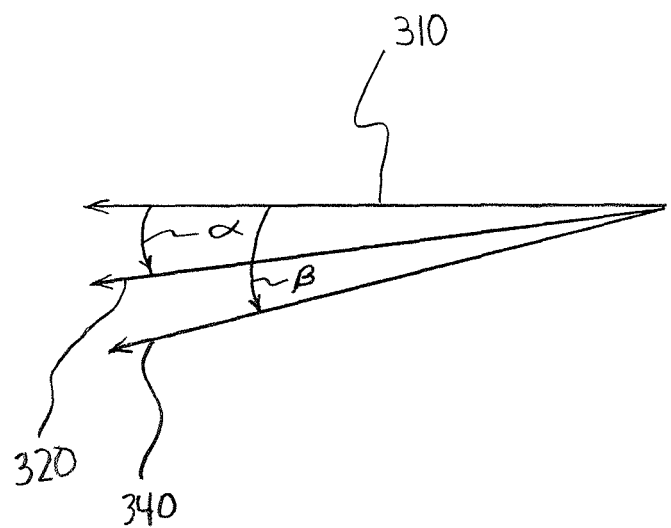
FIG. 17 is a diagram showing exemplary relative angles for two air nozzles on the masking head of the machine of FIG. 1.

FIG. 17 depicts the orientations of the noted first 320 and second 340 axes, relative to each other and relative to a reference axis 310, which is parallel to the front surface 210 of the glazing panel 200 shown in FIG. 16. In one non-limiting example, the angle a is about 15 degrees, and the angle b is about 25 degrees, such that the angle g is about 10 degrees. This arrangement has been found to yield surprising results in terms of laying the leading end 79 of the masking material 75 onto the roller wiper 55 without leaving wrinkles or folds in the masking material.

The first nozzle 32 can advantageously be part of a row of first nozzles that emits the first air stream. Alternatively, the first nozzle 32 can be an elongated slit-like nozzle. Likewise, the second nozzle 34 can be part of a row of second nozzles that emits the second airstream, or it can be an elongated slit-like nozzle.

The first 32 and second 34 nozzles can advantageously be part of (e.g., mounted on) an air-knife assembly 40 of the masking applicator head 20. Preferably, this assembly 40 is movable independently relative to the roller wiper 50. This is perhaps best appreciated by comparing FIGS. 5 and 6. As noted above, the illustrated air-knife assembly 40 is operable to trap, and thereby temporarily retain, an end region of the masking material 75 between the air-knife assembly and the roller wiper assembly 50, such that a leading end 79 of the masking material projects outwardly (e.g., away from the masking head 20, toward the glazing panel 200) and terminates at a free edge, which is spaced a distance from both the air-knife assembly and the roller wiper assembly. The illustrated air-knife assembly 40 is also operable to blow the leading end 79 of the masking material 75 onto the roller wiper 55, as discussed above.

Figure 18:
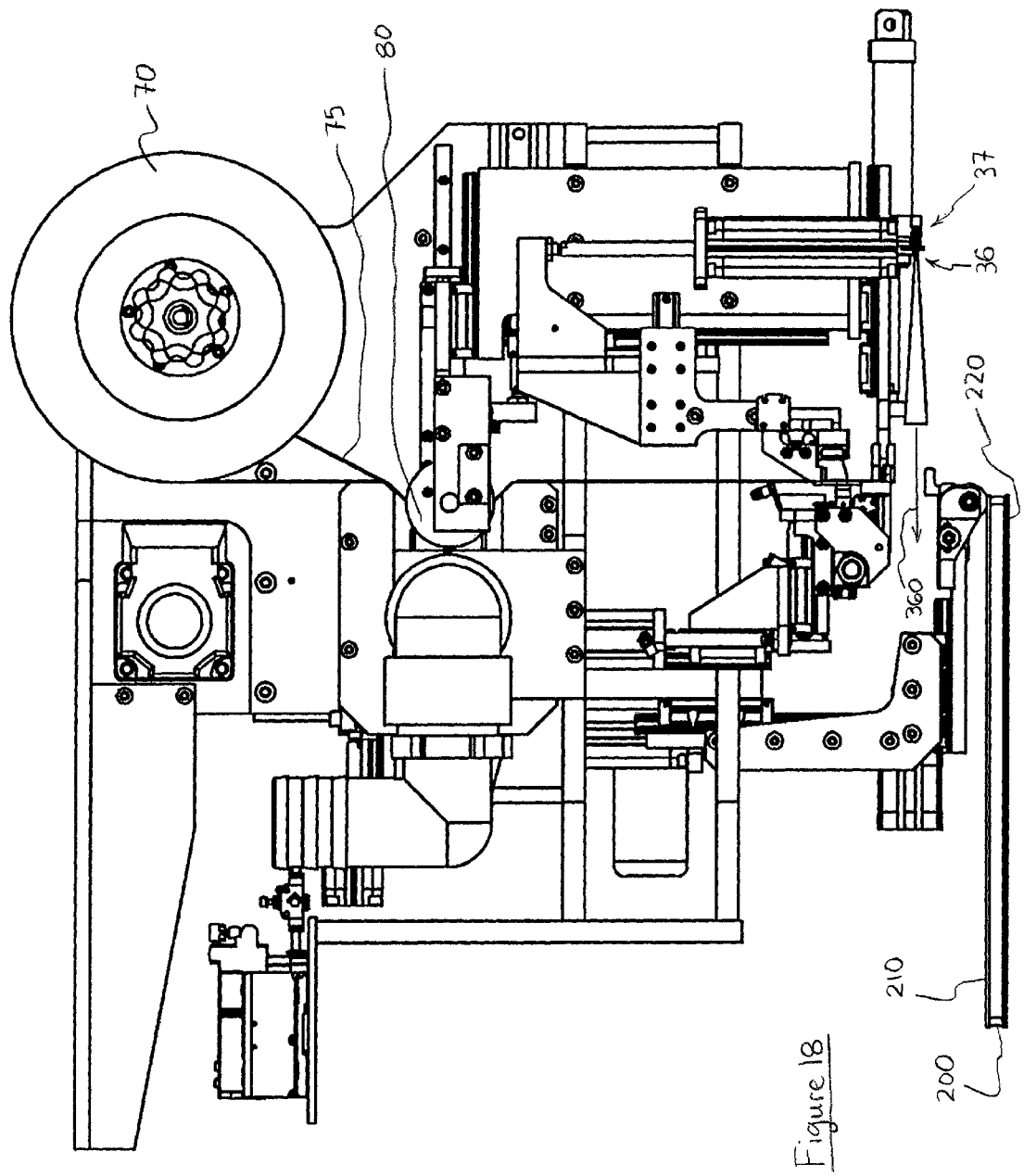
FIG. 18 is a top view of the masking head of the machine of FIG. 1, with schematic depiction of operation of another air nozzle on the masking head.

In the embodiment illustrated, the masking machine 10 is shown with a third nozzle 36. Reference is made to FIG. 16. This nozzle 36 is operable to deliver a third air stream that prevents the leading end of the masking material 75 from touching the glazing panel 200 until the roller wiper 50 is moved toward the glazing panel to adhesively secure the first face of the masking material to the first surface of the glazing panel. As shown in FIG. 18, the third nozzle 36 is oriented to direct the third air stream along a third axis 360, which preferably is offset from the first axis 320 by an acute angle and is offset from the second axis 340 by an acute angle. The third nozzle 36 preferably is adapted to emit an air stream that extends between the front surface 210 of the glazing panel 200 and the leading end 79 of the masking material 75 to be applied. The third nozzle 36, when provided, can optionally be oriented such that the third axis 360 is parallel to the lateral axis LA of the masking machine 1, and/or parallel to the front surface 210 of the glazing panel 200 to be masked. Reference is made to FIG. 18.

The third nozzle 36 can be part of a row of third nozzles that emits the third airstream. Or the third nozzle can be an elongated slit-like nozzle. The third nozzle 36 (or the row of third nozzles) can advantageously be mounted to a second assembly 37 of the masking applicator head 20. The second assembly 37 preferably is movable independently relative to the roller wiper 50. This is perhaps best appreciated by comparing FIGS. 6 and 7. Here, the second assembly 37 is movable both along the lateral axis LA and the Z axis. This, however, is not required for all embodiments. In the embodiment illustrated, the second assembly 37 is a cutting board assembly, as noted above.

Figure 19:
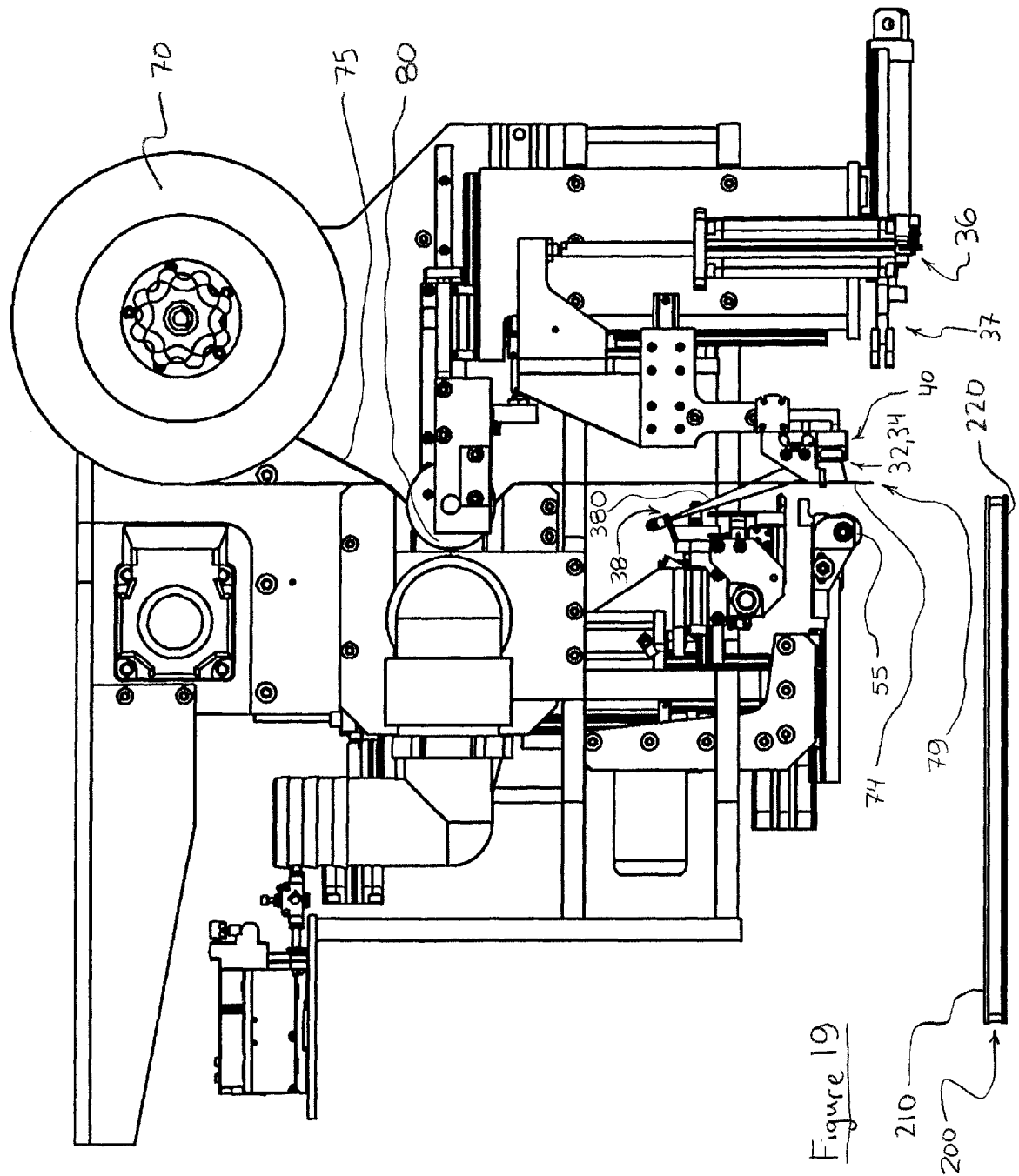
FIG. 19 is a top view of the masking head of the machine of FIG. 1, with schematic depiction of operation of still another air nozzle on the masking head.

The illustrated masking machine further includes a fourth nozzle 38. Reference is made to FIG. 19. This nozzle 38 is operable to deliver an air stream (depicted schematically by an elongated triangle) 380 that keeps the leading end 79 of the masking material 75 separated from the roller wiper assembly 50 when roller wiper assembly retracts away from the glazing panel 200. This is perhaps best appreciated by referring to FIGS. 9 and 10. The fourth nozzle 38 can be part of a row of fourth nozzles that emits the fourth airstream. Or the fourth nozzle can be an elongated slit-like nozzle.

The fourth nozzle 36 (or the row of third nozzles) can advantageously be mounted to a third assembly 60 of the masking applicator head 20. The third assembly 60 preferably is movable independently relative to the roller wiper 50. This is perhaps best appreciated by comparing FIGS. 6 and 7. Here, the second assembly 37 is movable along the lateral axis LA. This, however, is not required for all embodiments. In the embodiment illustrated, the third assembly 37 is a cutting assembly, as noted above.

Thus, the masking machine 10 preferably is equipped with a plurality of air knifes. In the embodiment illustrated, the machine 10 comprises three air knifes, all facing different directions. The first air knife comprises the first 32 and second 34 nozzles (or the first and second rows of nozzles), which are operable to blow the leading end 79 of the masking material 75 onto the roller wiper 55. The second air-knife comprises the third nozzle 36 (or the row of third nozzles), which is operable to deliver an air stream that prevents the leading end 79 of the masking material 75 from touching the glazing panel 200 until the roller wiper 50 is moved toward the glazing panel to secure the first face 72 of the masking material to the first surface 210 of the glazing panel. The third air-knife comprises the fourth nozzle 38 (or the row of fourth nozzles), which is operable to deliver an air stream that keeps the leading end of the masking material 75 separated from the roller wiper assembly 50 when the roller wiper assembly retracts away from the glazing panel 200.

In other embodiments, the first air knife is omitted in favor of other means for laying the leading end of the masking material onto the roller wiper. In such cases, the so-called third 36 and/or fourth 38 nozzles can be present, although there may not actually be four (or even three) air nozzles on the machine. Additionally or alternatively, the second air-knife may be omitted in favor of other means for preventing the leading end of the masking material from touching the glazing panel until the roller wiper is moved toward the glazing panel to secure the first face of the masking material to the first surface of the glazing panel. In such cases, the so-called fourth 38 nozzle can be present, although there may not actually be four air nozzles on the machine. Finally, the third air-knife may be omitted in favor of other means for keeping the leading end of the masking material separated from the roller wiper assembly when the roller wiper assembly retracts away from the glazing panel. In such cases, the first 32 and second 34 nozzles can be present, and/or the third nozzle 36 may be present, although there may not actually be three air nozzles on the machine.

Figure 13:
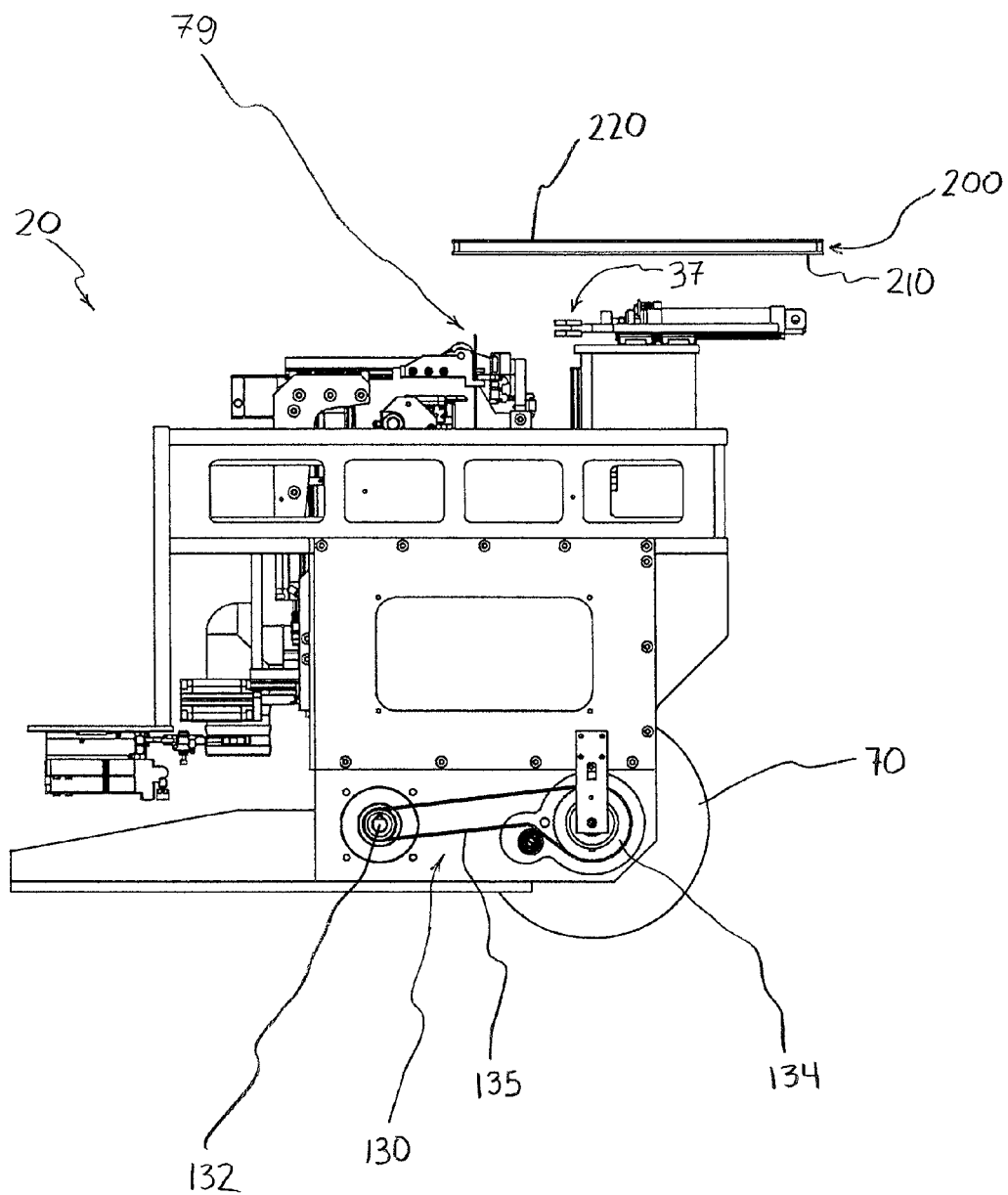
FIG. 13 is a bottom view of the masking head of the machine of FIG. 1.

The masking machine 10 can advantageously include a tension mechanism 130 configured to apply back tension on the roll 70 of masking material as it is unrolled. The tension mechanism 130 can comprise a back tension servo motor 132 moving a back tension drive belt 135 connected to a spindle 134 that carries the roll 70 of masking material. One exemplary arrangement is shown in FIG. 13. It is to be appreciated, however, that this is merely one possible arrangement for back tensioning the roll; other back tension mechanisms can be used.

In a second group of embodiments, the invention provides a masking machine 10 having a pre-stretch system operable to stretch a section of masking material 75 so as to remove wrinkles from that section of masking material. This is done before the masking material section in question is secured in its entirety to the first surface 210 of the glazing panel 200. Preferably, the pre-stretch system is operable to perform the pre-stretch operation before the masking material section is laid onto the roller wiper (or any other type of wiper that may be provided). Reference is made to FIGS. 20A-20C. Here, the pre-stretch system comprises a mount 45 that temporarily retains a leading region of the masking film 75. In the embodiment illustrated, the first face 72 of the masking film 75 is temporarily secured (e.g., adhered) to the mount 45. The mount 45 has a compact position and an expanded position. The mount 45 when in its expanded position stretches the masking film. In contrast, when the mount is in its compact position, the masking film is at rest, or at least not stretched as much.

In the embodiment of FIGS. 20A-20C, the mount 45 comprises an elongated body that has a greater length when in its expanded position than when in its compact position. With this arrangement, the masking material 75 is initially adhered to the mount 45 when the mount is in its compact position. To then perform the pre-stretch operation, the mount is moved to its expanded position, and thereby elongated, while the masking material 75 remains adhered to the mount. Thus, the mount 45 can advantageously comprise an elongated flexible strip to which the masking material 75 adheres. In such cases, the strip can be stretched, and thereby elongated, while the masking material 75 remains adhered to the strip. This can remove wrinkles from the masking material, e.g., before it is laid onto the roller wiper 55.

In one non-limiting example, the mount 45 is a flexible, elongated strip of vinyl. One end 41 of the strip is anchored, while the other end 49 is attached to a pneumatic cylinder 47, which is operable to stretch the flexible strip axially. This is perhaps best appreciated by referring to FIGS. 20A and 20B. The arrow S in FIG. 20A depicts the direction in which the pneumatic cylinder 47 stretches the flexible strip.

In an alternate embodiment, the mount comprises two separate moveable bodies temporarily respectfully holding the top and bottom edge regions of the masking material. These two bodies can be moved away from each other so as to stretch the masking material, thereby removing wrinkles. Given the present teaching as a guide, other suitable mount arrangements will be apparent to those of ordinary skill this technology area.

In the second group of embodiments (providing a masking machine having a pre-stretch system), a roller wiper can advantageously be provided. It is to be appreciated, however, that a pre-stretch mechanism in accordance with the second group of embodiments can alternatively be used with a conventional friction wiper or the like. Moreover, in the present embodiments, the masking machine may or may not be constructed to switch masking rolls itself (e.g., the machine can be designed for manual roll changes). More will be said of this later.

Thus, in some embodiments, the masking machine has a pre-stretch system, but does not have a roller wiper and is not constructed to switch masking rolls itself. In other embodiments, the masking machine has a pre-stretch system and a roller wiper, but is not capable of switching masking rolls itself. In still other embodiments, the masking machine has a pre-stretch system and is constructed to switch masking rolls itself, but does not use a roller wiper. In preferred embodiments, the masking machine has all three of these features in combination.

In the embodiment illustrated, the masking machine 10 is operable to apply a plurality of sequentially overlapped strips of masking material 75 onto a glazing panel 200. It is not required, however, that the masking machine be adapted to apply sequentially overlapped strips of masking material. For example, a pre-stretch system in accordance with the present disclosure can be incorporated quite advantageously into a masking machine embodiment that is adapted to simply apply a single piece of masking material to cover the entire masked area of the front surface of each glazing panel to be masked on the machine.

In embodiments where the masking material 75 is applied in the form of sequentially overlapped strips, it can be advantageous to subject the second face 74 of the masking material to a corona treatment before the overlapped strips are applied to the glazing panel 200. This can render the surface of the masking material's second face 74 more receptive to adhesion. Thus, the masking machine 10 can advantageously comprise a corona treatment device 80. In the embodiment illustrated, the corona treatment device 80 is part of the masking applicator head 20. Preferably, the corona treatment device 80 is positioned between the roll 70 of masking material 75 and the roller wiper 55. In such cases, the second face 74 of a length of the masking material 75 can be corona treated while that length of masking material moves from the roll 70 toward the roller wiper 55. Reference is made to FIGS. 3-10, 12, 14-16, 18, and 19. In one non-limiting example, the corona treatment device 80 is a covered roll corona treater station. In other embodiments, the corona treatment device 80 can be replaced by an atmospheric-pressure plasma treater station, a flame plasma treater station, or a chemical plasma treater station.

Figure 12:
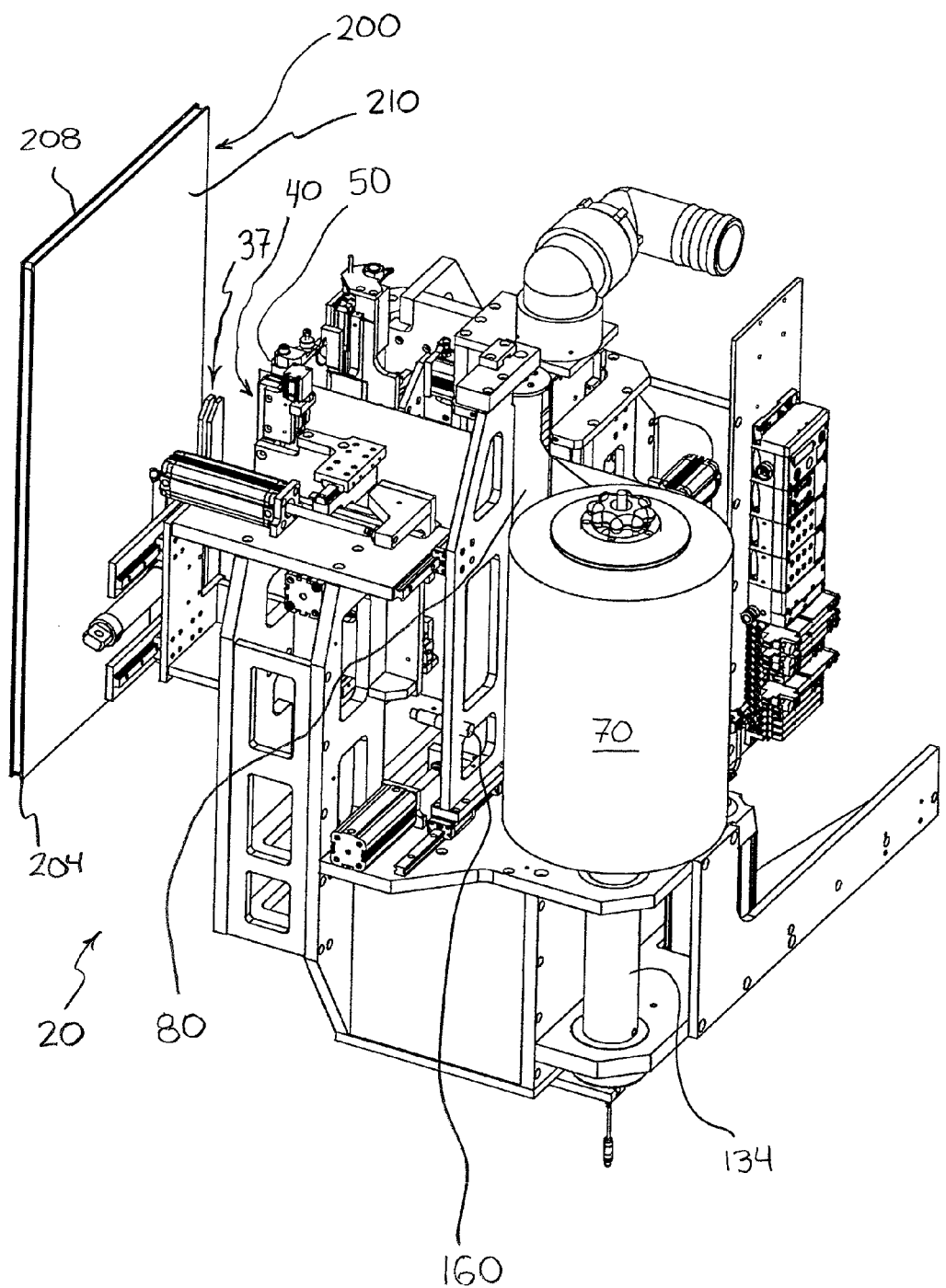
FIG. 12 is a perspective view of the masking head of the machine of FIG. 1.

The masking machine 10 of any embodiment of this disclosure can advantageously comprise a roll-change sensor 160 operable to automatically determine when the roll 70 of masking material 75 is to be changed. Reference is made to FIG. 12. The roll-change sensor 160 can be operable, for example, to measure the diameter of the roll 70 of masking material 75, and/or to determine when the roll diameter has reached (or dropped below) a certain minimum. In the embodiment illustrated, the roll-change sensor 160 is mounted on the masking head 20. Thus, the sensor 160 is configured to move (e.g., horizontally, vertically, or both) together with the masking head 20 relative to the rear support 100. In one non-limiting example, the roll-change sensor 160 is an ultrasonic analog sensor operable to measure the diameter of the roll 70 of masking material 75. It is to be appreciated, however, that other types of roll-change sensors can be used. For example, a weight sensor can be provided to determine when the weight of the roll reaches (or drops below) a certain minimum weight. Alternatively, a sensor can be provided to determine how much length of masking material has been dispensed, and/or to determine when a certain benchmark total dispensed length has been reached.

A third group of embodiments provides a masking machine 10 constructed to switch masking rolls 70 itself. In these embodiments, the masking machine may or may not have a roller wiper. Similarly, the masking machine may or may not have a pre-stretch system in the present embodiments. Thus, in some embodiments, the masking machine is constructed to switch masking rolls itself, but does not have a roller wiper or a pre-stretch system. In other embodiments, the masking machine is constructed to switch masking rolls itself, and it has a roller wiper, but no pre-stretch system. In still other embodiments, the masking machine is constructed to switch masking rolls itself, and it has pre-stretch system, but not a roller wiper. In preferred embodiments, the masking machine has all three of these features in combination.

In the embodiment illustrated, the masking machine 10 comprises a masking applicator head 20 carrying a roll 70 of masking material 75. The masking machine 10 is operable to itself remove the roll 70 of masking material 75 from the masking applicator head 20, and to thereafter mount a new roll 70' of masking material on the masking applicator head. Reference is made to FIG. 1.

In FIG. 1, the masking machine 10 has a plurality of roll-change devices 600. Preferably, the machine has at least three such devices. In the embodiment illustrated, there are three roll-change devices 600. However, one alternate embodiment provides just two roll-change devices, and another alternate embodiment provides four or more such devices.

In the embodiment illustrated, each roll-change device 600 is capable of performing two different operations: (i) removing a roll 70 from the masking applicator head 20, and (ii) loading a new roll 70' onto the masking applicator head when the head is empty (i.e., when not loaded with a roll). In alternate embodiments, the masking machine has one or more first roll-change devices that are each dedicated to (e.g., only capable of) performing operation (i), and one or more second roll-change devices that are each dedicated to performing operation (ii). It is to be appreciated that a roll-change operation may be appropriate in different circumstances, e.g., when the existing roll 70 is depleted (or close to being depleted), when a different width of masking material is to be used, when a different thickness or composition of masking material is to be used, etc.

In the embodiment illustrated, the roll-change devices 600 are spaced-apart from one another along the lateral axis LA of the masking machine 10. The masking applicator head 20 is movable along the lateral axis LA, relative to the roll-change devices 600, such that the head 20 can be aligned selectively with any desired one of the roll-change devices 600. For example, in FIG. 1, to remove the roll 70 shown on the applicator head 20, the head would be moved to either of the two roll-change devices 600 on the right (as seen in FIG. 1). These two roll-change devices 600 are not carrying masking rolls; they are therefore available to perform an unloading operation. Thus, the masking head 20 may be moved into alignment with, for example, the middle one of the three roll-change devices 600, and that roll-change device could then be actuated to remove the existing roll 70 from the masking head. Next, the empty masking head could be moved into alignment with the left-most of the three roll-change devices 600, and that roll-change device could then be actuated to mount new roll 70' onto the masking head.

In the embodiment of FIG. 1, each roll-change device 600 has a retracted position and an extended position. When in the retracted position, the illustrated roll-change device 600 is spaced apart from (i.e., does not contact) the masking applicator head 20. In moving from the retracted position to the extended position, the illustrated roll-change device 600 (e.g., an engagement portion thereof) moves toward the masking applicator head 20. When in the extended position, the illustrated roll-change device 600 engages the masking applicator head 20. Reference is made to FIGS. 21C-21E and 22B-22D, which are discussed below.

In the embodiment of FIG. 1, each roll-change device 600 has an engagement portion 607 that is movable relative to a base 690. As shown in FIG. 1, the base 690 is mounted to a stationary frame 695 of the masking machine 10. As is perhaps best shown in FIGS. 23A-26C, the engagement portion 607 comprises a carriage 630 that is movable along the base 690, e.g., along a track thereof. The engagement portion 607 of each roll-change device 600 includes a frame 610, which is configured to project into the masking applicator head 20 when the roll-change device is in its extended position. The frame 610 includes a retention bar 605 to which the adhesive face 72 of the leading end 79 of the masking material 75 can be adhered, as shown in FIGS. 25A-26C. The engagement portion 607 of each roll-change device 600 has a roll-seat 650 configured to receive a roll 70, 70' of masking material 75. This is perhaps best seen in FIGS. 23A, 24A, 25A, and 26A. When a roll 70, 70' of masking material is positioned on the roll-seat 650, a leading length of the masking material 75 extends through an opening defined by the frame 610 and is secured adhesively to the retention bar 605 of the frame. Reference is made to FIGS. 26A-26C.

Figure 24B:
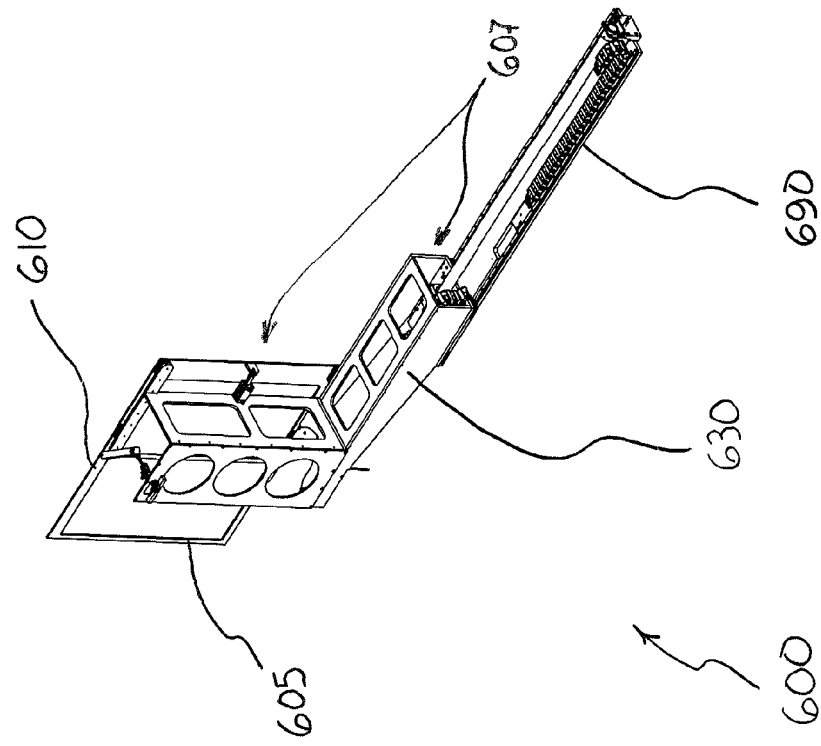
FIGS. 24A and 24B are perspective detail views of the roll-change device of FIGS. 23A and 23B, with the roll-change device shown in an extended position without a roll of masking material.
Figure 24A:
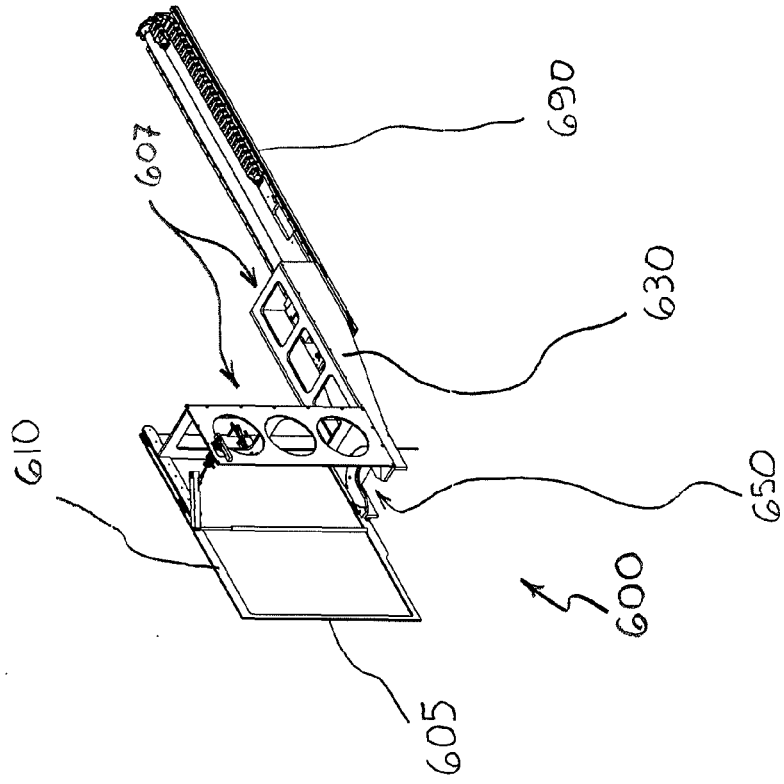

FIGS. 21A-21F depict the operation of a roll-change device 600 to remove a roll 70 from the masking applicator head 20. In FIG. 21A, the masking applicator head 20 carries a roll 70 of masking film 75, while the roll-change device 600 is empty (i.e., it is not carrying a roll of masking film). Here, the roll-change device 600 is in the retracted position. This empty, retracted position is perhaps best shown in FIGS. 23A and 23B. FIG. 21B shows the masking applicator head prepared for a roll-unloading operation, i.e., operation (i). The roll-change device 600 remains in the retracted position, and the corona treatment device 80 on the head 20 has been moved to an open position. FIG. 21C shows the roll-change device 600 in the extended position. Here, the roll 70 rests on the roll seat 650 of the roll-change device 600, while the frame 610 of the roll-change device projects into the masking applicator head 20. FIGS. 24A and 24B depict the extended position of the roll-change device (for illustration purposes, the roll 70 and the masking applicator head 20 are not shown here). The leading end 79 of the masking material 75 is adhered to the retention bar 605 of the frame 610 by retracting the air-knife assembly 40 and the masking material is peeled from the mount 45 of the air-knife assembly 40. In FIG. 21D, the leading end 79 of the masking film 75 has been so transferred from the mount 45 to the retention bar 605. The resulting manner in which the roll 70 and the leading end 79 of the masking material 75 are retained by the roll-change device 600 is shown in FIGS. 25A and 25B (here again, for illustration purposes, the masking applicator head 20 is not shown). In FIG. 21E, the cutter assembly 60 has been retracted from the masking film 75, and the masking applicator head 20 has been lowered to disengage the roll 70 from the head 20. The roll-change device 600 carrying the roll 70 then retracts away from the head 20, thus removing the roll from the head. FIG. 21F shows the roll-change device 600 in the resulting retracted position. This loaded, retracted position of the roll-change device 600 is also shown in FIGS. 26A-26C. Here, the roll 70 is ready to be loaded back into the masking applicator head 20 when needed.

FIGS. 22A-22F depict operation of a roll-change device 600 to load a new roll 70' onto the masking applicator head 20 when the head is empty (i.e., not carrying a roll of masking material). FIG. 22A shows the masking applicator head 20 empty, while the roll-change device 600 carries a roll 70' of masking material. Here, the roll-change device 600 is in the loaded, retracted position. This position is perhaps best shown in FIGS. 26A-26C. Thus, FIG. 22A shows the masking applicator head 20 prepared for a roll-loading operation, i.e., operation (ii). In FIG. 22B, the roll-change device 600 has been moved to its extended position, so as to engage the masking applicator head 20, and the head has been raised so as to support the roll 70'. In FIG. 22C, the air-knife assembly 40, cutter assembly 60, and cutting board assembly 37 have been extended and the film's leading end 79 has been cut from the frame 610 of the roll-change device 600. In FIG. 22D, the masking applicator head 20 has been raised so as to completely disengage the roll 70 from the roll-change device 600. In FIG. 22E, the empty roll-change device 600 has been moved to its retracted position. In FIG. 22F, the masking applicator head 20 has been closed, and the corona treatment device 80, the air-knife assembly 40, and the cutter assembly 60 are extended; the head 20 is thus ready for applying masking material 75 onto a glazing panel.

The illustrated masking machine 10 is operable to apply a plurality of sequentially overlapped strips of masking material 75 onto a glazing panel 200. As noted above, however, it is not required that all embodiments of the masking machine be adapted to apply sequentially overlapped strips of masking material. For example, an automated roll-change system in accordance with the present disclosure can be incorporated quite advantageously into a masking machine embodiment that is adapted to simply apply a single piece of masking material to cover the entire masked area of the front surface of each glazing panel to be masked on the machine.

The invention also provides methods of applying masking material onto glazing panels. One embodiment provides a method of masking glazing panels using a masking machine 10 having a roller wiper 55 that is simultaneously rotatable about a longitudinal axis CA of the roller wiper and subject to relative linear motion, with respect to a glazing panel 200, along a desired axis of the masking machine 10. Preferably, the desired axis (which in some cases is a lateral axis LA) of the masking machine 10 is crosswise to the longitudinal axis CA of the roller wiper 55. The method involves providing the glazing panel 200 at a masking station of the machine. The glazing panel 200 has opposed front 210 and rear 220 surfaces. Preferably, the front surface 210 of the glazing panel 200 is oriented toward the roller wiper 55. The method also involves providing a masking material 75 having opposed first 72 and second 74 faces. The first face 72 of the masking material 75 preferably carries adhesive. The roller wiper 55 is moved toward the glazing panel 200 so as to press the masking material 75 against the glazing panel such that the first face 72 of the masking material is secured (in some cases, adhesively) to the front surface 210 of the glazing panel, and a desired length of the masking material is applied to the glazing panel by rolling the roller wiper along the front surface of the glazing panel, thereby securing (in some cases, adhesively securing) the desired length of the masking material to a desired width of the front surface of the glazing panel.

In preferred embodiments of the present method, a roller force of 5-12.5 pounds per inch is used during the rolling of the masking wiper 55 along the first surface 210 of the glazing panel 200. In one non-limiting example, the roller wiper operates at 5 bar or 72 psi for a 16 inch roller using a 40 mm bore pneumatic cylinder, which translates to 141 pounds of force or 8.8 pounds per inch of roller force. The roller wiper 55 can advantageously have a foam cover, such as an EPDM foam rubber with 12-18 pounds foam density and 11-15 pounds firmness at 25% deflection.

The roller force range of 5-12.5 pounds per inch can advantageously be used in combination with subjecting the roller wiper to relative linear motion, with respect to the glazing panel, at a linear speed of 50-130 inches per minute along the desired axis of the masking machine 20. It is to be appreciated, however, that these parameters can be varied in other embodiments. Moreover, the present method can involve performing the relative linear motion in different ways (moving the roller wiper relative to a stationary glazing panel, etc.), as has already been discussed.

The present method can advantageously comprise wrapping a leading end 79 of the masking material 75 around a desired circumferential extent of the roller wiper 55 by delivering first and second air streams that blow the leading end of the masking material around the desired circumferential extent of the roller wiper. The first and second air streams can advantageously be directed respectively along first 320 and second 340 axes that are offset from each other by an acute angle. Reference is made to FIGS. 16 and 17 and the previous discussion of those figures.

As noted above, the masking machine 10 preferably comprises a masking applicator head 20 that is movable relative to the glazing panel 200. In the present method, the first air stream can be emitted by operating a first nozzle or a row of first nozzles 32, while the second airstream is emitted by operating a second nozzle or a row of second nozzles 34. Preferably, the first 32 and second 34 nozzles are part of an air-knife assembly 40 of the masking applicator head 20. Using the illustrated masking machine embodiment, the air-knife assembly 40 is movable independently relative to the roller wiper 55.

The present method can optionally further comprise delivering a third air stream to prevent the leading end 79 of the masking material 75 from touching the glazing panel 200 until the roller wiper 55 is moved toward the glazing panel. In such cases, the third air stream preferably is directed along a third axis 360. As shown in FIG. 18, the third axis 360 can advantageously be parallel, or at least generally parallel, to the first surface 210 of the glazing panel 200 to be masked.

As noted above, the masking machine 10 comprises a masking applicator head 20 that is movable relative to the glazing panel 200. In performing the present method using the illustrated machine embodiment, the first air stream is emitted by operating a first nozzle or a row of first nozzles 32, the second airstream is emitted by operating a second nozzle or a row of second nozzles 34, and the third airstream is emitted by operating a third nozzle or a row of third nozzles 36. Here, the first 32 and second 34 nozzles are part of an air-knife assembly 40 of the masking applicator head 20. The illustrated air-knife assembly 40 is movable independently relative to the roller wiper 55. The third nozzle or row of third nozzles 36 are mounted to a second assembly 37 of the masking applicator head. With the illustrated machine embodiment, the second assembly 37 is moveable independently relative to the roller wiper 55. The second assembly 37 is a cutting board assembly in the illustrated machine embodiment, as discussed above.

The present method can optionally include performing a pre-stretch operation. As noted above, the illustrated masking machine comprises a pre-stretch system. In such cases, the present method can comprise actuating the pre-stretch system, before applying the desired length of masking material 75 to the glazing panel 200, so as to stretch the masking material to remove wrinkles. When provided, the pre-stretch system can advantageously comprise a mount 45 to which the masking material 75 is adhered temporarily. Preferably, the mount 45 has a compact position and an expanded position. In such cases, actuating the pre-stretch system comprises moving the mount 45 from its compact position to its expanded position, while the masking material 75 is adhered to the mount. This stretches the masking material 75 in a width direction of the masking material (e.g., by simultaneously pulling the masking material in opposite directions, which are parallel to arrow S in FIG. 20A).

When provided, the mount 45 can advantageously comprise a flexible elongated strip to which the masking material 75 is adhered temporarily. Reference is made to FIGS. 20A-20C. In such cases, actuating the pre-stretch system comprises stretching the strip, so as to further elongate the strip, while the masking material is adhered to the strip, thereby stretching the masking material in the width direction of the masking material.

Preferably, the masking machine 10 is loaded with a roll 70 of masking material 75. The present method can thus advantageously involve unrolling some of the masking material 75 from the roll 70 by pulling the desired length of masking material past the roller wiper 55. In some embodiments of this nature, the method comprises applying back tension on the roll 70 of masking material 75 as it is unrolled. Reference is made to the back-tension system shown in FIG. 13, and the previous discussion related to that figure.

In some method embodiments, the masking machine 10 comprises an upright platen 100 supporting the rear surface 220 of the glazing panel 200, and a conveyor 90 adjacent a bottom region of the upright platen, where the conveyor supports a bottom edge 204 of the glazing panel. In such embodiments, the method preferably comprises operating the conveyor 90 to move the glazing panel 200 along the lateral axis LA of the masking machine 10. As noted above, the masking machine 10 can optionally have one or more automated sensors 105, 195 that detect the presence of the glazing panel 200 at a position on the lateral axis LA of the masking machine 10. In such cases, the conveyor 90 can advantageously be operated to move the glazing panel 200 along the lateral axis LA of the masking machine 10 such that the glazing panel moves to a sensor position whereupon an edge (e.g., a leading or trailing edge) of the glazing panel is detected by the sensor. Preferably, the sensor or sensors 105, 195 are located on the upright platen 100. Reference is made to the optional sensor system shown in FIG. 2, and the previous discussion related to that figure.

In the embodiment of FIG. 1, the masking machine 10 includes a masking applicator head 20, an upright beam 140, and two horizontal beams 180. Here, the masking applicator head 20 is mounted so as to be moveable along the upright beam 140, and the upright beam is mounted so as to be moveable horizontally along the two horizontal beams 180. In such cases, the masking method preferably involves moving the masking applicator head 20 along the upright beam 140, and subsequently moving the masking applicator head horizontally by moving the upright beam horizontally along the two horizontal beams 180.

The masking applicator head 20 shown in FIG. 1 carries a roll 70 of masking material 75. The present method can advantageously comprise unrolling some of the masking material 75 from the roll 70 while simultaneously moving the masking applicator head 20 together with the roll horizontally by moving the upright beam 140 horizontally along the two horizontal beams 180. Moreover, after moving the masking applicator head 20 horizontally by moving the upright beam 140 horizontally along the two horizontal beams 180, the method can optionally further comprise cutting the desired length of the masking material 75 from the roll 70.

As discussed previously, the masking machine 10 of FIG. 1 is loaded with a roll 70 of masking material 75. The masking machine 10 preferably has a roll-change sensor 160 that automatically determines when the roll 70 needs to be changed. In such cases, the method further comprises operating the roll-change sensor 160 to identify when the roll 70 is to be changed. Reference is made to the roll-change system of FIG. 12, and the previous discussion of that figure.

In some embodiments, the masking machine 10 is automated to switch masking rolls itself. Such is the case in the embodiment of FIG. 1, where, as noted above, the masking machine 10 comprises a masking applicator head 20 carrying a roll 70 of masking material 75. Some method embodiments therefore involve operating the masking machine 10 such that the machine itself removes the roll 70 of the masking material 75 from the masking applicator head 20 and mounts a new roll 70' of masking material on the masking applicator head. Reference is made to the methods described above with respect to FIGS. 21A-26C. The illustrated masking machine 10 is automated to switch masking rolls itself by having a series of roll-change devices 600 spaced-apart along a lateral axis LA of the masking machine. The masking machine comprises a masking applicator head 20 carrying a roll 70 of the masking material 75. Thus, the present method can further comprise selecting two of the spaced-apart roll-change devices 600, operating a first of those two roll-change devices such that the machine 10 itself removes the roll 70 of the masking material 75 from the masking applicator head 20, and thereafter operating a second of those two roll-change devices such that the machine itself mounts a new roll 70' of masking material on the masking applicator head.

In some embodiments, the masking machine 10 is capable of applying, and is operated so as to apply, a plurality of sequentially overlapped strips of the masking material 75 onto the first surface 210 of the glazing panel 200. In such embodiments, the masking machine 10 can optionally further comprises a corona treatment device 80. When provided, the corona treatment device 80 preferably is configured to corona treat the second face 74 of the masking material 75. Reference is made to the previous discussion of the optional corona treatment device 80.

In one non-limiting example, the masking machine is controlled using an industrial controller with integrated motion controller for controlling servo motor position, speed, and torque. The masking machine also has a HMI for machine control functions as starting the masker, monitoring IGU data, and status information regarding the masker and the IGU being processed. The HMI also provides visual aids, explanations, and remedies when faults occur during operation. Servo motors are used on the servo conveyors for IGU transport, Cartesian style gantry with X and Y servo axis for controlling the application head motion, and a servo back tension axis for controlling the back tension of the application head. An ethernet based pneumatic valve with integrated electronic input and outputs (I/O) is used to control actuations on the head and monitor actuations as in feedback from pneumatic actuators. A second pneumatic valve bank with electronic I/O is used for functions on the back board of the machine. A third pneumatic valve with I/O is used to control functions on the roll changer. Pneumatic valves with electronic I/O are connected to the PLC controller via a machine network, which enables the direct control and monitoring of valves and I/O from the PLC. The masking machine can operate in two modes, MTO (made to order) and MTS (made to stock). In MTO mode, a barcode reader is used to obtain IGU barcode number and the PLC communicates this number with production database to obtain manufacturing information regarding IGU loaded into the masking machine, unit length, height and thickness, etc. In MTO mode, the information regarding the IGU is manually entered into the HMI. The PLC controller will calculate the amount of laps to be applied to an IGU based on the IGU height and the roll width loaded on the masker. Once the IGU is processed, it is transported from the machine to allow the next IGU to enter the masking machine. During operation, the masking machine monitors the amount of film on the application head and initiates an automatic roll change if insufficient film is remaining on the application head to process the next IGU.

While some preferred embodiments of the invention have been described, it should be understood that various changes, adaptations and modifications may be made therein without departing from the spirit of the invention and the scope of the appended claims.

What is claimed is:

1. A masking machine for masking glazing panels, the masking machine having a masking applicator head that is moveable horizontally and vertically, the moveable masking applicator head comprising a roller wiper assembly and a first assembly that includes: (i) a first nozzle or a row of first nozzles, and (ii) a second nozzle or a row of second nozzles, the roller wiper assembly comprising a roller wiper which has a cylindrical film-handling surface, the masking machine having a roll of masking material incorporated into the moveable masking applicator head, the roller wiper and the roll of masking material both being mounted to a unitary framework of the moveable masking applicator head, the first nozzle or row of first nozzles and the second nozzle or row of second nozzles collectively being oriented to blow a leading end of the masking material onto a desired circumferential extent of the cylindrical film-handling surface of the roller wiper by delivering first and second air streams along first and second axes that are offset from each other by a positive acute angle such that the leading end of the masking material is blown onto the desired circumferential extent of the cylindrical film-handling surface of the roller wiper without leaving wrinkles or folds in the masking material, the roller wiper being simultaneously rotatable about a longitudinal axis of the roller wiper and subject to relative linear motion, with respect to a glazing panel having opposed front and rear surfaces, along a desired axis of the masking machine, the desired axis of the masking machine being crosswise to the longitudinal axis of the roller wiper, the masking machine having a masking station constructed to receive the glazing panel such that the front surface of the glazing panel is oriented toward the roller wiper, the masking material having opposed first and second faces, the roller wiper being movable toward the glazing panel to press the masking material against the glazing panel such that the first face of the masking material is secured to the front surface of the glazing panel, and the roller wiper being operable to apply a desired length of the masking material to the glazing panel by rolling along the front surface of the glazing panel and thereby securing the desired length of the masking material to a desired width of the front surface of the glazing panel.

2. The masking machine of claim 1 further comprising a third nozzle or a row of third nozzles, the third nozzle or row of third nozzles being proximate the front surface of the glazing unit and oriented to deliver a third air stream that extends between the roller wiper and the front surface of the glazing panel so as to prevent the leading end of the masking material from touching the glazing panel until the roller wiper is moved toward the glazing panel to secure the first face of the masking material to the front surface of the glazing panel, the third nozzle or row of third nozzles being oriented to direct the third air stream along a third axis, the third axis being offset from the first axis by an acute angle and being offset from the second axis by an acute angle.

3. The masking machine of claim 2 wherein the third nozzle or row of third nozzles is part of a second assembly of the masking applicator head, the second assembly being movable independently relative to the roller wiper and relative to the first assembly.

4. The masking machine of claim 2 wherein the third axis, which is offset from the first axis by an acute angle and is offset from the second axis by an acute angle, is parallel to the front surface of the glazing panel.

5. The masking machine of claim 1 further comprising an automated sensor that detects the presence of the glazing panel at a position on a lateral axis of the masking machine, the masking machine comprising a conveyor operable to move the glazing panel along the lateral axis of the masking machine such that the glazing panel moves to said position whereupon an edge of the glazing panel is detected by the sensor, the sensor being located on an upright platen configured to support the rear surface of the glazing panel.

6. The masking machine of claim 1 wherein the masking machine is operable to apply a plurality of sequentially overlapped strips of the masking material onto the front surface of the glazing panel by making at least two successive passes of the roller wiper along the front surface of the glazing panel, the glazing panel being a multi-pane insulating glass unit comprising two glass panes.

7. The masking machine of claim 1 wherein the moveable masking applicator head is mounted so as to be moveable along an upright beam that is moveable horizontally along two horizontal beams.

8. A masking machine having a masking applicator head and roller wiper that is simultaneously rotatable about a longitudinal axis of the roller wiper and subject to relative linear motion, with respect to a glazing panel having opposed front and rear surfaces, along a desired axis of the masking machine, the desired axis of the masking machine being crosswise to the longitudinal axis of the roller wiper, the masking machine having a roll of masking material incorporated into the masking applicator head, the masking material having opposed first and second faces, the first face of the masking material carrying adhesive, the roller wiper and the roll of masking material both being mounted to a unitary framework of the masking applicator head, the masking machine having a masking station constructed to receive the glazing panel such that the front surface of the glazing panel is oriented toward the roller wiper, the roller wiper being movable toward the glazing panel to press the masking material against the glazing panel such that the first face of the masking material is secured adhesively to the front surface of the glazing panel, and the roller wiper being operable to apply a desired length of the masking material to the glazing panel by rolling along the front surface of the glazing panel and thereby adhesively securing the desired length of the masking material to a desired width of the front surface of the glazing panel, and wherein the masking machine comprises a pre-stretch system operable to stretch the masking material so as to remove wrinkles before applying said desired length of the masking material to the glazing panel.

9. The masking machine of claim 8 wherein the pre-stretch system comprises a mount to which the masking material can be adhered temporarily by the adhesive on the first face of the masking material, the mount having a compact position and an expanded position, the pre-stretch system being operable to move the mount from its compact position to its expanded position, while the masking material remains adhered to the mount, so as to stretch the masking material in a width direction of the masking material.

10. The masking machine of claim 9 wherein the mount comprises a flexible elongated strip to which the masking material can be adhered temporarily, the pre-stretch system being operable to stretch the flexible elongated strip so as to further elongate the flexible elongated strip, while the masking material is remains adhered to the flexible elongated strip, and thereby stretch the masking material in the width direction of the masking material.

11. A masking machine having a masking applicator head and a roller wiper that is simultaneously rotatable about a longitudinal axis of the roller wiper and subject to relative linear motion, with respect to a glazing panel having opposed front and rear surfaces, along a lateral axis of the masking machine, the lateral axis of the masking machine being crosswise to the longitudinal axis of the roller wiper, the masking machine having a masking station constructed to receive the glazing panel such that the front surface of the glazing panel is oriented toward the roller wiper, the masking machine having a roll of masking material incorporated into the masking applicator head, the masking material having opposed first and second faces, the first face of the masking material carrying adhesive, the roller wiper and the roll of masking material both being mounted to a unitary framework of the masking applicator head, the roller wiper being movable toward the glazing panel to press the masking material against the glazing panel such that the first face of the masking material is secured to the front surface of the glazing panel, and the roller wiper being operable to apply a desired length of the masking material to the glazing panel by rolling along the front surface of the glazing panel and thereby adhesively securing the desired length of the masking material to a desired width of the front surface of the glazing panel, and wherein the masking machine is constructed to switch masking rolls itself by having a plurality of roll-change devices spaced-apart along the lateral axis of the masking machine, each of the multiple spaced-apart roll-change devices being operable to perform two different operations: (i) removing the roll from the masking applicator head, and (ii) loading a new roll onto the masking applicator head when the masking applicator head is empty.

12. The masking machine of claim 11 wherein the masking applicator head is moveable along the lateral axis of the masking machine relative to the roll-change devices spaced-apart along the lateral axis of the masking machine such that the masking applicator head can be aligned selectively with any desired one of the roll-change devices, each roll-change device having a retracted position and an extended position, such that when the masking applicator head is aligned with one of the roll-change devices that is in the retracted position such roll-change device is spaced apart from the masking applicator head and when such roll-change device is in the extended position it engages the masking applicator head.

13. The masking machine of claim 11 wherein each of the roll-change devices spaced-apart along the lateral axis of the masking machine has a base and an engagement portion, the base being mounted to a stationary frame of the masking machine, the engagement portion comprising a carriage that is movable along the base, the engagement portion including a frame that is configured to project into the masking applicator head when the roll-change device of which it is part is in the extended position, the engagement portion having a roll-seat configured to receive a roll of masking material.

14. The masking machine of claim 13 wherein the frame of the engagement portion includes a retention bar to which the adhesive on the first face of the leading end of the masking material can be adhered.

15. The masking machine of claim 14 wherein a roll of masking material is positioned on the roll-seat of one of the roll-change devices, and a leading length of masking material from the roll of masking material on such roll-seat extends through an opening defined by the frame of the engagement portion and is secured adhesively to the retention bar.

16. The masking machine of claim 11 wherein the masking machine has a roll-change sensor operable to automatically determine when the roll of masking material on the masking applicator head is to be changed.

17. The masking machine of claim 11 wherein the plurality of roll-change devices spaced-apart along the lateral axis of the masking machine comprises at least three such roll-change devices.

18. A masking machine for masking glazing panels, the masking machine having a masking applicator head, the masking applicator head comprising a roller wiper assembly and a first assembly that includes: (i) a first nozzle or a row of first nozzles, and (ii) a second nozzle or a row of second nozzles, the roller wiper assembly comprising a roller wiper which has a cylindrical film-handling surface, the masking machine having a roll of masking material incorporated into the masking applicator head, the roller wiper and the roll of masking material both being mounted to a unitary framework of the masking applicator head, the first nozzle or row of first nozzles and the second nozzle or row of second nozzles collectively being oriented to blow a leading end of the masking material onto a desired circumferential extent of the cylindrical film-handling surface of the roller wiper by delivering first and second air streams along first and second axes that are offset from each other by a positive acute angle such that the leading end of the masking material is blown onto the desired circumferential extent of the cylindrical film-handling surface of the roller wiper without leaving wrinkles or folds in the masking material, the roller wiper being simultaneously rotatable about a longitudinal axis of the roller wiper and subject to relative linear motion, with respect to a glazing panel having opposed front and rear surfaces, along a lateral axis of the masking machine, the lateral axis of the masking machine being crosswise to the longitudinal axis of the roller wiper, the masking machine having a masking station constructed to receive the glazing panel such that the front surface of the glazing panel is oriented toward the roller wiper, the masking material having opposed first and second faces, the first face of the masking material carrying adhesive, the roller wiper being movable toward the glazing panel to press the masking material against the glazing panel such that the first face of the masking material is secured adhesively to the front surface of the glazing panel, and the roller wiper being operable to apply a desired length of the masking material to the glazing panel by rolling along the front surface of the glazing panel and thereby adhesively securing the desired length of the masking material to a desired width of the front surface of the glazing panel.

\* \* \* \* \*